US010620441B2

(12) United States Patent
Van Der Auwera et al.

(10) Patent No.: US 10,620,441 B2
(45) Date of Patent: Apr. 14, 2020

(54) VIEWPORT-AWARE QUALITY METRIC FOR 360-DEGREE VIDEO

(71) Applicant: QUALCOMM Incorporated, San Diego, CA (US)

(72) Inventors: Geert Van Der Auwera, Del Mar, CA (US); Muhammed Coban, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 126 days.

(21) Appl. No.: 15/833,786

(22) Filed: Dec. 6, 2017

(65) Prior Publication Data

US 2018/0164593 A1 Jun. 14, 2018

Related U.S. Application Data

(60) Provisional application No. 62/434,305, filed on Dec. 14, 2016.

(51) Int. Cl.
*G02B 27/01* (2006.01)
*G06F 3/01* (2006.01)
(Continued)

(52) U.S. Cl.
CPC ......... *G02B 27/0172* (2013.01); *G06F 3/012* (2013.01); *G06F 3/013* (2013.01); *G06F 3/04815* (2013.01); *G06T 3/0031* (2013.01); *H04N 17/004* (2013.01); *H04N 21/816* (2013.01); *G02B 2027/014* (2013.01); *G02B 2027/0123* (2013.01);
(Continued)

(58) Field of Classification Search
CPC ..... G06T 19/006; G06T 15/00; G06T 11/003; G06T 9/00; G06T 2207/20076; H04N 21/816
See application file for complete search history.

(56) References Cited

U.S. PATENT DOCUMENTS

2017/0084086 A1* 3/2017 Pio ..................... H04N 21/816
2018/0098131 A1* 4/2018 Zhou .................. H04N 21/6373
(Continued)

OTHER PUBLICATIONS

Choi B., et al., "WD on ISO/IEC 23000-20 Omnidirectional Media Application Format", 116th MPEG Meeting; Oct. 17, 2016-Oct. 21, 2016; Chengdu; (Motion Picture Expert Group or ISO/IEC JTC1/SC29/WG11),, No. N16439, Nov. 14, 2016, XP030023111, 55 pages.
(Continued)

*Primary Examiner* — Xuemei Zheng
(74) *Attorney, Agent, or Firm* — Polsinelli LLP

(57) ABSTRACT

Techniques and systems are provided for processing 360-degree video data. For example, 360-degree video data can be obtained that includes a representation including spherical video data mapped to faces of a geometry. The representation includes a viewport corresponding to an orientation in a 360-degree scene. A window can be determined on a spherical representation of the 360-degree scene at the orientation corresponding to the viewport of the representation. The window is determined based on a front face of the geometry corresponding to the representation. A viewport-aware quality metric can then be determined for the window on the spherical representation of the 360-degree scene.

27 Claims, 17 Drawing Sheets

(51) Int. Cl.
*H04N 21/81* (2011.01)
*G06T 19/00* (2011.01)
*G06T 3/00* (2006.01)
*H04N 17/00* (2006.01)
*G06F 3/0481* (2013.01)

(52) U.S. Cl.
CPC .............. *G02B 2027/0138* (2013.01); *G02B 2027/0187* (2013.01); *G06T 19/006* (2013.01)

(56) References Cited

U.S. PATENT DOCUMENTS

2018/0160160 A1* 6/2018 Swaminathan .... H04N 21/2662
2018/0167613 A1* 6/2018 Hannuksela ..... H04N 21/23439

OTHER PUBLICATIONS

Fogg (Movielabs) C: "Essential Metadata to Support Virtual Reality in AVC and HEVC Elementary Video Streams", 25th JCT-VC Meeting; Oct. 14, 2016-Oct. 21, 2016; Chengdu; (Joint Collaborative Team on Video Coding of ISO/IEC JTC1/SC29/WG11 and ITU-T SG.16 ); URL: http://wftp3.itu.int/av-arch/jctvc-site/,, No. JCTVC-Y0023-v4, Oct. 21, 2016, XP030118062, 10 pages.
International Search Report and Written Opinion—PCT/US2017/065099—ISA/EPO—dated Mar. 14, 2018.
Kammachi Sreedhar K., et al., "AHG8: Testing Methodology for Viewport-Dependent Encoding and Streaming", 4th JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/,,No. JVET-D0079, Oct. 6, 2016, 3 pages.
Polin L., et al., "VR ROI indication", 116th MPEG Meeting; Oct. 17, 2016-Oct. 21, 2016; Chengdu; (Motion Picture Expert Group or ISO/IEC JTC1/SC29/WG11),, No. m38953, Sep. 15, 2016, XP030067301, 6 pages.
Van Der Auwera G., et al., "AHG8: Truncated Square Pyramid Projection (TSP) for 360 Video", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/, No. JVET-D0071, Oct. 6, 2016 (Oct. 6, 2016), XP030150304, 9 Pages.
Van Der Auwera G., et al., "AHG8: TSP Evaluation With Viewport-Aware Quality Metric For 360 Video", 5th JVET Meeting; Dec. 1, 2017-Jan. 20, 2017; Geneva; (The Joint Video Exploration Team of ISO/IEC JTC1/SC29/WG11 and ITU-T SG.16); URL: http://phenix.int-evry.fr/jvet/,,No. JVET-E0070, Jan. 4, 2017, XP030150552, 10 pages.
Yu M., et al., "A Framework to Evaluate Omnidirectional Video Coding Schemes", 2015 IEEE International Symposium on Mixed and Augmented Reality, Department of Electrical Engineering Stanford University, 2015, DOI: 10.1109/ISMAR.2015.12, [retrieved on Nov. 11, 2015], pp. 31-36.

* cited by examiner

VIEWPORT-AWARE QUALITY METRIC FOR 360-DEGREE VIDEO

CROSS-REFERENCE TO RELATED APPLICATIONS

This application claims the benefit of U.S. Provisional Application No. 62/434,305, filed Dec. 14, 2016, which is hereby incorporated by reference, in its entirety and for all purposes.

FIELD

This application is related to 360-degree video. More specifically, this application relates to systems and methods for providing a viewport-aware quality metric for 360-degree video.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. One type of video is 360-degree video. 360-degree video can provide viewers an immersed experience. For example, 360-degree video can provide a viewer with a virtual reality experience, putting the viewer in a virtually different time and/or place. As another example, 360-degree video can provide a viewer with a first-person view of video content captured by a remote device (e.g., an unmanned aerial vehicle, or other device).

BRIEF SUMMARY

In some examples, techniques and systems are described herein for determining a viewport-aware quality metric for 360-degree video. A viewport refers to a particular view within a 360-degree scene, which can be rendered for display. For example, multiple video representations can be generated for the 360-degree scene by capturing video frames from different viewpoints or orientations within the 360-degree scene. Each representation can be associated with a different viewport for the 360-degree scene. Such a representation is referred to herein as a viewport representation. A sphere geometry can be defined that provides a spherical representation of the 360-degree scene. A viewer can view the sphere geometry using a 360-degree video display device, such as a head-mounted display, a mobile device, and/or other suitable device. 360-degree video is spherical in nature, and can be projected onto one or more planes of a geometry before being provided to the 360-degree video display device.

A viewport-based video scheme can attempt to deliver to the 360-degree video display device the viewport representation (and the associated viewport) with 360-degree video data representing a portion of a sphere geometry that is closest to a viewer's field-of-view (FOV) at full quality (e.g., at full resolution); the remaining portion of the 360-degree video data is provided at a lower quality. The varying quality of the 360-degree video data of a representation can be provided by projecting (or mapping) the 360-degree video data (which includes spherical video data) of the representation to one or more planes of a geometry. A geometry can include, for example, a truncated square pyramid (TSP), an equirectangular shape, a cube, a cylinder, a dodecahedron, and/or other suitable geometry. The sphere geometry can be covered by multiple viewports, allowing seamless switching between the representations based on a head orientation and/or position of the viewer. In some cases, the multiple viewports can be overlapping on the sphere geometry. A switch between viewport representations can occur as the viewer's head orientation crosses one or more viewport switching boundaries.

The viewport-aware quality metric can be determined based on one or more windows defined on the sphere geometry. A window can be defined on the sphere geometry based on a particular viewport representation. The window can represent a viewable region (an observable window) on the sphere geometry. For example, a window can be defined based, at least in part, on a front face of the geometry to which the viewport representation is projected. Using a TSP as an example, a field of view of the front face of the TSP (corresponding to the highest resolution portion of the 360-degree video data of the viewport representation) can be used to define the window for that viewport representation. In some cases, one or more other factors can also be used to define a window, such as an amount of separation between viewports on the sphere geometry, head rotational speed, switching delay, and/or any other suitable factors. The viewport-aware quality metric of the video data within the window can then be determined. In some cases, multiple windows can be defined on the sphere, and viewport-aware quality metrics can be determined for all of the windows. The multiple windows can correspond to some or all of the viewport representations available for a 360-degree scene. In some examples, the window centers on the sphere geometry coincide with front viewport centers of the viewport representations. In such cases, a combined viewport-aware quality metric for the viewport representations can be determined.

The viewport-aware quality metric (or combined viewport-aware quality metric) indicates a quality of the 360-degree video data when mapped to the geometry. For example, the viewport-aware quality metric can represent a comparison between the original 360-degree video and the coded 360-degree video, thus indicating the coding efficiency of the 360-degree video data mapped to a certain geometry. Using a TSP as an example, the coding efficiency of the different viewport representations, when mapped to a TSP geometry, can be provided based on the determined viewport-aware quality metric (or combined viewport-aware quality metric).

According to at least one example, a method of processing 360-degree video data is provided. The method comprises obtaining the 360-degree video data. The 360-degree video data includes a representation including spherical video data mapped to faces of a geometry. The representation includes a viewport corresponding to an orientation in a 360-degree scene. The method further comprises determining a window on a spherical representation of the 360-degree scene at the orientation corresponding to the viewport of the representation. The window is determined based on a front face of the geometry corresponding to the representation. The method further comprises determining a viewport-aware quality metric of the window on the spherical representation of the 360-degree scene.

In another example, an apparatus for processing 360-degree video data is provided that includes a memory configured to store the 360-degree video data and a processor. The processor is configured to and can obtain the 360-degree video data. The 360-degree video data includes a representation including spherical video data mapped to faces of a geometry. The representation includes a viewport corresponding to an orientation in a 360-degree scene. The processor is further configured to and can determine a window on a spherical representation of the 360-degree scene at the orientation corresponding to the viewport of the representation. The window is determined based on a front face of the geometry corresponding to the representation. The processor is further configured to and can determine a viewport-aware quality metric of the window on the spherical representation of the 360-degree scene.

In another example, a non-transitory computer-readable medium is provided having stored thereon instructions that, when executed by one or more processors, cause the one or more processor to: obtain the 360-degree video data, the 360-degree video data including a representation including spherical video data mapped to faces of a geometry, wherein the representation includes a viewport corresponding to an orientation in a 360-degree scene; determine a window on a spherical representation of the 360-degree scene at the orientation corresponding to the viewport of the representation, the window being determined based on a front face of the geometry corresponding to the representation; and determine a viewport-aware quality metric of the window on the spherical representation of the 360-degree scene.

In another example, an apparatus for processing 360-degree video data is provided. The apparatus includes means for obtaining the 360-degree video data. The 360-degree video data includes a representation including spherical video data mapped to faces of a geometry. The representation includes a viewport corresponding to an orientation in a 360-degree scene. The apparatus further includes means for determining a window on a spherical representation of the 360-degree scene at the orientation corresponding to the viewport of the representation. The window is determined based on a front face of the geometry corresponding to the representation. The apparatus further includes means for determining a viewport-aware quality metric of the window on the spherical representation of the 360-degree scene.

In some aspects, the 360-degree video data includes a plurality of representations including spherical video data mapped to faces of the geometry. Each representation of the plurality of representations includes a different viewport corresponding to a different orientation in a 360-degree scene. In such aspects, the method, apparatuses, and computer-readable medium described above may further comprise: determining a plurality of windows on the spherical representation of the 360-degree scene, each of the plurality of windows being determined based on each front face of the geometry corresponding to each representation; determining viewport-aware quality metrics for the plurality of windows on the spherical representation of the 360-degree scene; and determining a combined viewport-aware quality metric for the plurality of representations.

In some aspects, determining the combined viewport-aware quality metric for the plurality of representations includes averaging the determined viewport-aware quality metrics for the plurality of windows.

In some aspects, the plurality of windows include front face centers of the plurality of representations distributed on the spherical representation of the 360-degree scene. In some aspects, the plurality of windows determined on the spherical representation of the 360-degree scene are overlapping.

In some aspects, determining the viewport-aware quality metric of the window on the spherical representation of the 360-degree scene includes computing a Spherical-Signal-to-Noise ratio (S-PSNR) of video data in the window. In such aspects, computation of the S-PSNR is restricted to the video data in the window to determine the viewport-aware quality metric of the window.

In some aspects, the geometry includes a truncated square pyramid (TSP), and the spherical video data of the representation is mapped to six faces of the TSP. In some aspects, the geometry includes a cube geometry. In some aspects, the geometry includes a geometry based on a downsampled cube map projection (DCP).

In some aspects, the window is determined by computing a probability weighted observable window size for the window. The probability weighted observable window size of the window is based on the front face of the geometry corresponding to the representation and at least one or more of an amount of separation between the window and at least one other window of at least one other representation of the 360-degree video data, an estimated head rotational speed of a viewer of the 360-degree video data, or a switching delay associated with switching between representations of the 360-degree video data.

In some cases, the apparatus comprises a camera for capturing the one or more images. In some cases, the apparatus comprises a mobile device with a camera for capturing the one or more images. In some cases, the apparatus comprises a display for displaying the one or more images.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
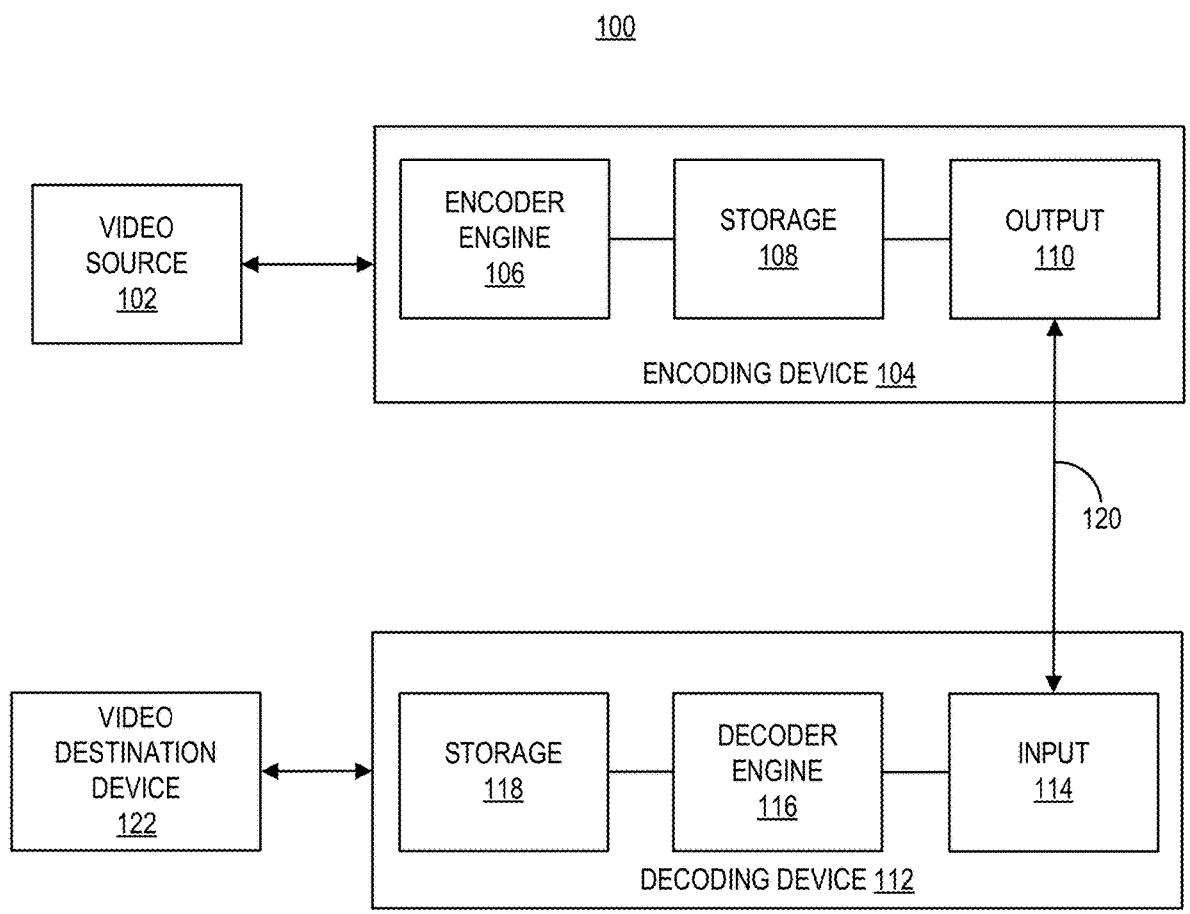
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Video content can be captured and coded as 360-degree video content. As described in more detail below, one or more systems and methods described herein are directed to determining a viewport-aware quality metric for 360-degree video data that is mapped (projected) to one or more planes of a geometry. The viewport-aware quality metric can be determined based on one or more windows defined on a sphere geometry (also referred to herein as a sphere) that provides a spherical representation of a 360-degree scene. For example, multiple video representations (referred to as viewport representations) can be generated for the 360-degree scene by capturing video frames from different viewpoints or orientations within the 360-degree scene. Each representation can be associated with a different viewport for the 360-degree scene. A window can be determined on the sphere representing the 360-degree scene based on a particular viewport representation. The window can be defined based, at least in part, on a front face of the geometry to which the viewport representation is projected. In some cases, one or more other factors can also be used to define a window, including an amount of separation between viewports on the sphere, head rotational speed, switching delay, and/or any other suitable factors. The one or more systems and methods can then determine a viewport-aware quality metric of the video data within the window. In some cases, multiple windows can be defined on the sphere, and viewport-aware quality metrics can be determined for all of the windows. The multiple windows can correspond to some or all of the viewport representations captured for a 360-degree scene. In such cases, a combined viewport-aware quality metric for the viewport representations can be determined. In some examples, the windows can be defined so that they are overlapping on the sphere.

360-degree video is video captured of a 360-degree scene or environment, and can be rendered for immersive display of the 360-degree scene or environment. For instance, 360-degree video can represent a three-dimensional scene or environment that can be interacted with in a seemingly real or physical way. In some cases, 360-degree video can be captured and rendered at very high quality, potentially providing a truly immersive 360-degree video or virtual reality experience. Illustrative examples of 360-degree video can include virtual reality video, augmented reality data, or any other type of 360-degree type of video content, whether captured, computer-generated, or the like. Illustrative examples of 360-degree video applications include live sporting events, augmented reality, gaming, training, education, sports video, online shopping, among others. In some cases, a user experiencing a 360-degree video environment uses electronic equipment, such as a head-mounted display (HMD), a mobile device, or other suitable device. In some cases, certain tools or clothing (e.g., gloves fitted with sensors) can be optionally used to interact with the virtual environment. As the user changes head orientation and/or moves in the real world, images rendered in the 360-degree video environment also change, giving the user the perception that the user is moving within the 360-degree video environment. In some cases, a 360-degree video environment can include sound that correlates with the movements of the user, giving the user the impression that the sounds originate from a particular direction or source.

In some applications, video from the real world can be used in the presentation of a 360-degree video or virtual reality environment, as opposed to computer-generated graphics that may be found, for example, in gaming and virtual worlds. In such real-world applications, a user can experience another location in the same way that the user can experience the user's present location. In one illustrative example, a user can experience a walking tour of Berlin while using a 360-degree video system that is situated in San Francisco. In some applications, 360-degree video can provide the ability to be virtually present in a non-physical world created by the rendering of natural and/or synthetic images (and in some cases sound) correlated by the movements of the immersed user, allowing the user to interact with that world.

A 360-degree video system can include a video capture device and a video display device, and possibly also other intermediate devices such as servers, data storage, and data transmission equipment. A video capture device may include a camera set, which can include a set of multiple cameras, each oriented in a different direction and capturing a different view. In one illustrative example, six cameras can be used to capture a full 360-degree view centered on the camera set's location. Some video capture devices may use fewer cameras. For example, some video capture devices can capture primarily side-to-side views or use lenses with a wide field of view. In one illustrative example, one or more cameras equipped with two fisheye lenses, positioned back-to-back, can be used to capture two images that together provide a 360-degree field of view. A video generally includes frames or pictures, where a frame or picture can include an electronically coded still image of a scene. Cameras capture a certain number of frames per second, which is usually referred to as the camera's frame rate.

In some cases, to provide a seamless 360-degree view, image stitching can be performed on the video frames (or images) captured by each of the cameras in the camera set. Image stitching in the case of 360-degree video generation involves combining or merging video frames from adjacent cameras (or lenses) in the area where the video frames overlap or would otherwise connect. The result would be an approximately spherical frame, and the merged data can be represented in a planar fashion. For example, the spherical frame can be mapped to planes of a geometry. A geometry can include, for example, a truncated square pyramid (TSP), an equirectangular shape, a cube, a cylinder, a dodecahedron, and/or other suitable geometry. For example, the pixels in a merged video frame may be projected or mapped onto the planes of a TSP shape, a cube shape, or some other three-dimensional, planar shape (e.g., a pyramid, an octahedron, a decahedron, etc.). Video capture and video display devices can operate on a raster principle—meaning that a video frame is treated as a grid of pixels—in which case square planes, rectangular planes, or other suitably-shaped planes can be used to represent a spherical environment.

360-degree video frames, mapped to a geometrical planar representation, can be encoded and/or compressed for storage and/or transmission. Encoding and/or compression can be accomplished using a video codec (e.g., code that is compliant with the High-Efficiency Video Coding (HEVC) standard, which is also known as H.265, the Advanced Video Coding standard, which is known as H.264, or other suitable codec) and results in a compressed video bitstream (or encoded video bitstream) or group of bitstreams. The video pictures of 360-degree video content can be encoded as a single-layer bitstream using temporal inter prediction (TIP), and the entire coded bitstream can be stored at a server. In some cases, the pictures of 360-degree video content can be encoded as a multi-layer bitstream using TIP and inter-layer prediction (ILP). Encoding of video data using a video codec is described in further detail below.

In some implementations, the encoded video bitstream(s) can be stored and/or encapsulated in a media format or file format. The stored bitstream(s) can be transmitted, for example, over a network, to a receiver device that can decode and render the video for display. Such a receiver device may be referred to herein as a video display device. For example, a 360-degree video system can generate encapsulated files from the encoded video data (e.g., using an International Standards Organization (ISO) base media file format and/or derived file formats). For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. In cases in which the encoded video bitstream(s) are stored and/or encapsulated in a media format or file format, the receiver device can support the media or file format that was used to pack the video bitstream into a file (or files), and can extract the video (and possibly also audio) data to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device, player device, or other suitable rendering device). Rendering devices include, for example, head-mounted displays, virtual reality televisions, mobile devices that support 360-degree video applications, and/or other 180-degree or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device (e.g., of the receiver device) may render a video at the same frame rate at which the video was captured, or at a different frame rate. If needed, the bitstream including the 360-degree video can be transmitted to the receiver side, fully decoded by the decoder, and the region of the decoded picture corresponding to a portion of a scene being viewed (referred to as the field of view (FOV) of a viewer) by the wearer can be rendered by the rendering device for viewing by the wearer. The FOV of the viewer can be determined by the head-mounted display, or other 360-degree video display device, based on the movement of the wearer's head and/or eyes.

As noted above, 360-degree video frames (e.g., mapped or projected to a geometry), can be encoded and/or compressed for storage and/or transmission, and a receiver device can decode and/or decompress the encoded 360-degree video frames. FIG. 1 is a block diagram illustrating an example of a video coding system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (JVET) to explore new coding tools for the next generation of video coding standard. The reference software is called JEM (joint exploration model).

Many embodiments described herein provide examples using the JEM model, the HEVC standard, and/or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame of a video is a still image of a scene. A picture or frame of the video data can include 360-degree video data mapped or projected onto planes of a geometry (e.g., a TSP, a cube, or other suitable geometry). The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bitrate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 23. An example of specific details of the decoding device 112 is described below with reference to FIG. 24.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

In some implementations, camera sets for capturing 360-degree video can include omnidirectional cameras, catadioptric cameras (a camera that uses lenses and curved mirrors), cameras equipped with fisheye lenses, and/or other suitable cameras. One example of an omnidirectional camera is the Ricoh Theta-S, which uses two fisheye lenses that focus in opposite directions.

Figure 2B:
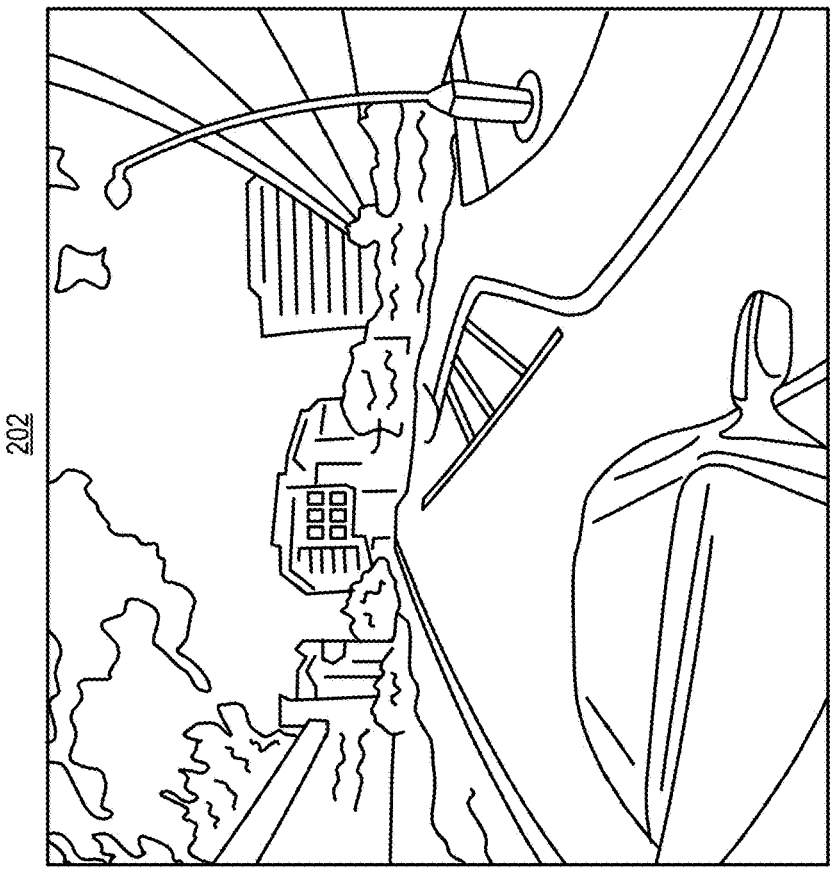
FIG. 2A and FIG. 2B are diagrams illustrating examples of video frames captured by omnidirectional cameras that use fisheye lenses to capture a wide field of view, in accordance with some examples.
Figure 2A:
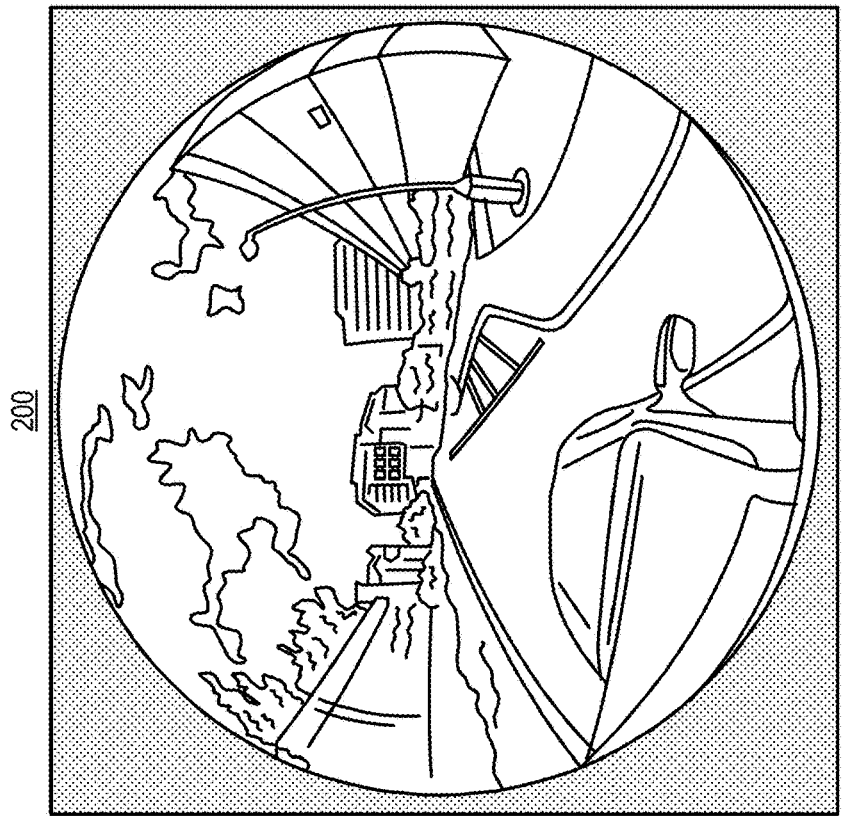

Omnidirectional cameras, such as catadioptric cameras and cameras with fisheye lenses, typically capture images with a significant amount of distortion. FIG. 2A and FIG. 2B illustrate examples of video frames captured by omnidirectional cameras that use fisheye lenses to capture a wide field of view. In the example of FIG. 2A, the video frame 200 includes a circular fisheye image. Fisheye lenses are capable of capturing very wide angles, such as 280 degrees or greater. Hence, a camera equipped with two fisheye lenses, positioned back-to-back, can capture two images that together provide 360 degrees of view (or more). Non-wide-angle fisheye lenses capture a field of view of on the order of about 45 to about 90 degrees. A field of view can alternatively or additionally be expressed in radians.

In order to capture a wide angle, fisheye lenses distort the image of a scene. As illustrated in FIG. 2A, the scene captured in the video frame 200 is circular in shape, and is warped from the center to the outside edges of this circular region. Because camera sensors are rectangular, the video frame 200 is rectangular and the image includes areas, here illustrated using stippling, that are not part of the scene. The pixels in these regions are considered not usable, since these pixels are not part of the scene.

The example of FIG. 2B includes a video frame 202 that includes a full-frame fisheye image. In this type of video frame 202, a wide-angle field of view has also been captured in a circular region, with the scene being warped into the circular region. In this example, the image has been scaled (e.g., made larger) so the scene fills the edges of the rectangular frame. This example video frame 202 does not include the unusable areas, and some parts of the scene that can be captured by the lens have been cropped out or not captured.

As described above, other types of cameras can also be used to capture 360-degree video. For example, a camera set can include a set of multiple cameras (e.g., 5, 6, 7, or other number of cameras needed to capture a sufficient number of views of a scene). Each camera can be oriented in a different direction and capturing a different view of a scene. Image stitching can then be performed on the video frames (or images) captured by each of the cameras in the camera set to provide a seamless 360-degree view.

Figure 3:
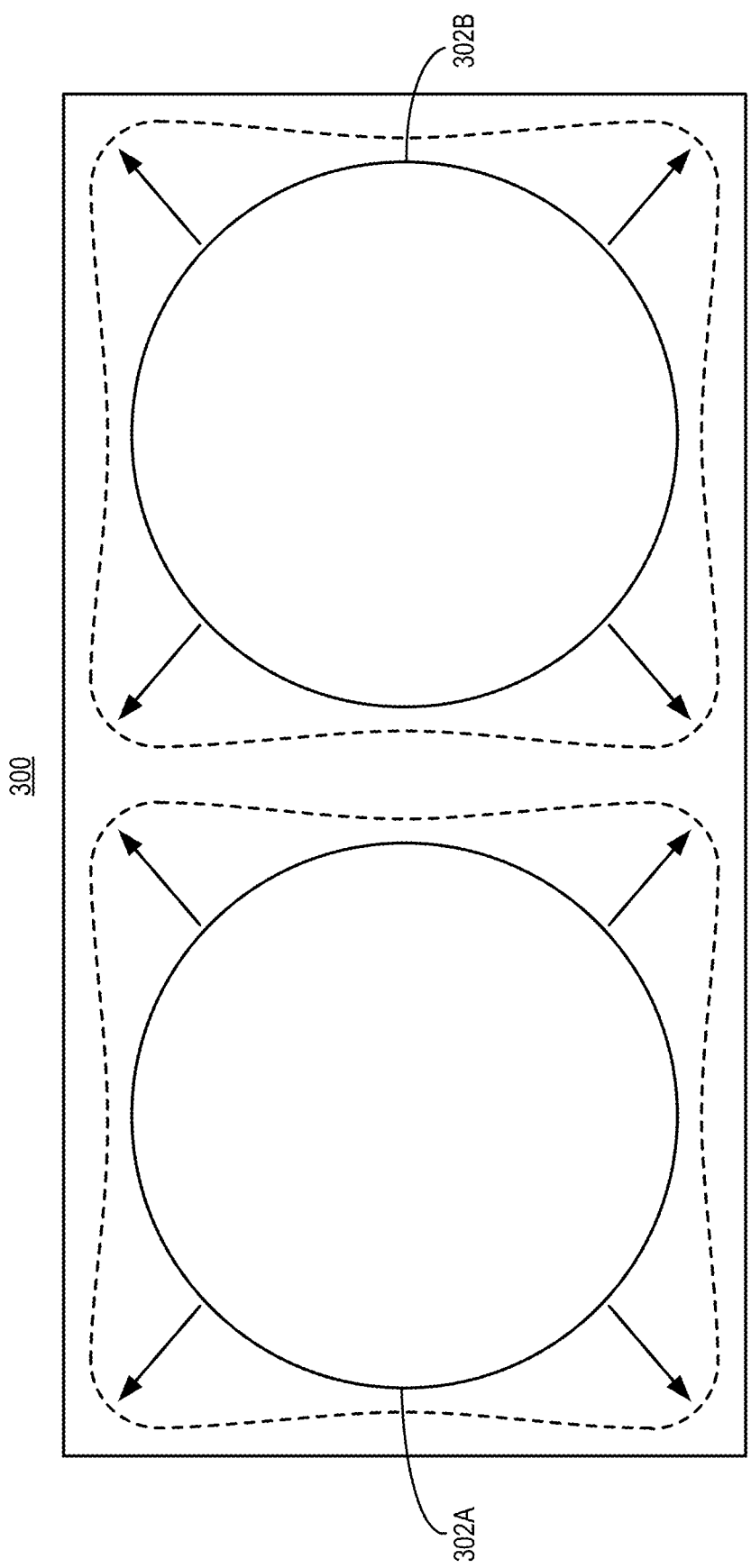
FIG. 3 is a diagram illustrating an example of an equirectangular video frame, in accordance with some examples.

360-degree video data is spherical in nature, and can be remapped to other formats. These other formats can be used to store, encode, transmit, decode, render, and/or view the 360-degree video. One example format is an equirectangular format. FIG. 3 illustrates an example of an equirectangular video frame 300 based on two fisheye images 302A, 302B. In this example equirectangular video frame 300, the usable pixels from the two fisheye images 302A, 302B (e.g., pixels in the circular regions) have been mapped into an equirectangular format. In this example, each fisheye image 302A, 302B includes a 180-degree or greater field of view, so that, together, the two fisheye images 302A, 302B encompass a 360-degree field of view (possibly with some overlap).

Mapping pixels from the fisheye images 302A, 302B has the effect of unwarping the scene captured in the fisheye images 302A, 302B, and stretching the pixels towards the edges of the video frame 300. The resulting equirectangular image may appear stretched at the top and bottom of the video frame 300. A well-known equirectangular projection is a Mercator projection, in which the geography of the Earth is presented with orthogonal latitude and longitude lines.

In various implementations, the fisheye images 302A, 302B can be mapped to other formats, such as a onto the faces formed by a cube, a cylinder, a pyramid, a truncated square pyramid (TSP), or some other geometric shape. In each of these cases, in the event fisheye lenses are used, distortion present in the fisheye images 302A, 302B can be corrected and unusable pixels can be eliminated. The planar data can also be packaged for storage and/or transmission, and can be used for displaying the 360-degree video. An example of a TSP geometry is described below with respect to FIG. 5A-FIG. 5D. In some cases, an intermediate format can be useful, for example, for storing and/or transmitting 360-degree video data, or for converting the video data to another format.

Figure 4A:
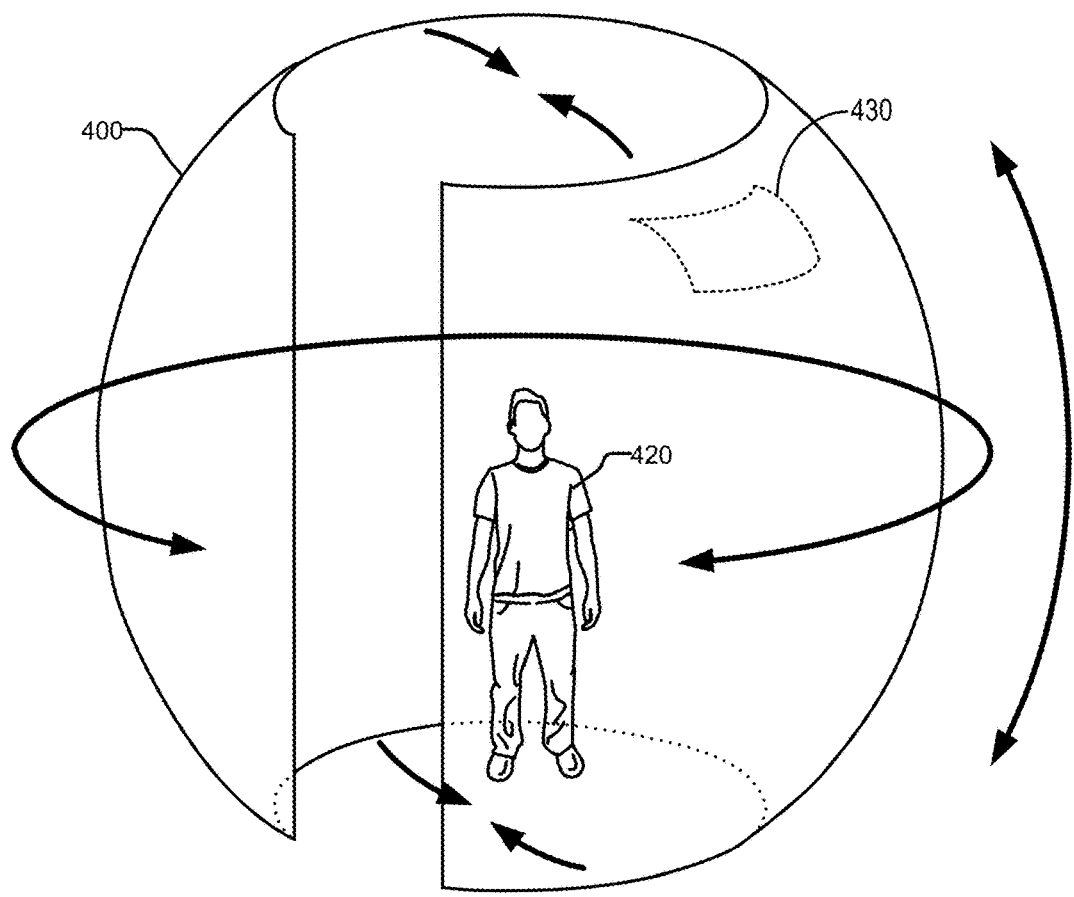
FIG. 4A and FIG. 4B are diagrams illustrating an example of a 360-degree video frame being used in a 360-degree video presentation, in accordance with some examples.
Figure 4B:
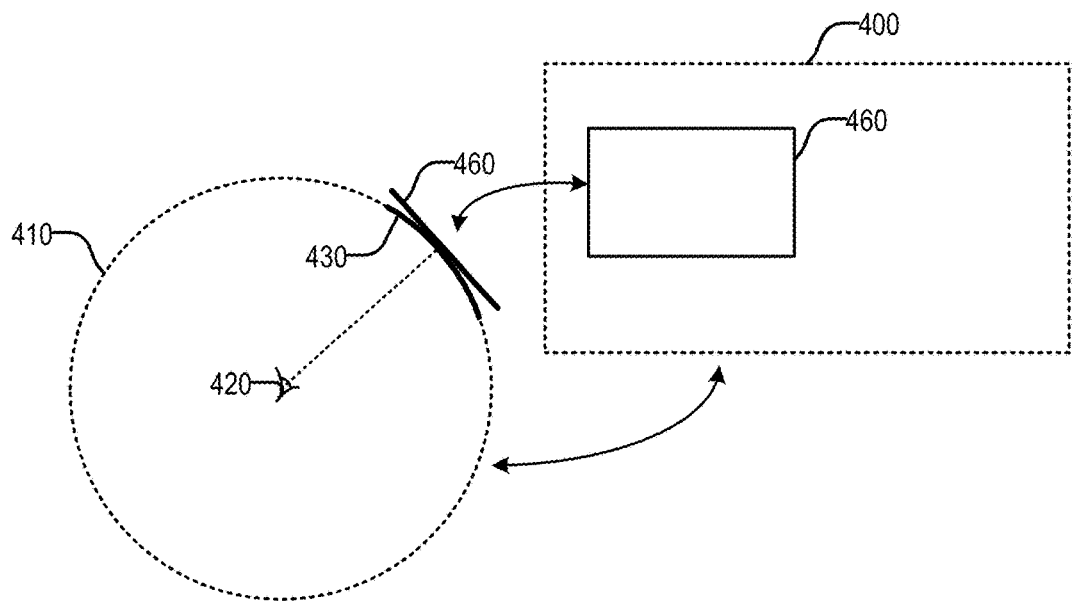

FIG. 4A and FIG. 4B illustrate an example of a 360-degree video frame 400 being used in a 360-degree video presentation. The 360-degree video frame 400 can be mapped onto a spherical space to form a spherical representation 410 (also referred to as a sphere) that represents a 360-degree scene or environment. A region 430 of the resulting spherical representation 410 (e.g., corresponding to a field of view (FOV) of a viewer 420) can be displayed to the viewer 420 using a 360-degree display device, such as a head mounted display (HMD) or a non-HMD display (e.g., a TV, a mobile device, a wearable device, or other suitable 360-degree video display device). For example, when a 360-degree video is played back on a 360-degree video display device, a viewport 460 can be rendered for display to the user. The viewport 460 can be a region (e.g., a rectangular region, or other suitable shape) on the plane of the 360-degree video frame 400 that is tangent to the sphere (e.g., the plane intersects with the sphere at a point in the region 430), where the plane of the viewport 460 is orthogonal to the user's viewing direction. In one illustrative example, a viewport can be generated by applying a projection technique to map the video data from the region 430 on the spherical representation 410 onto the plane of the 360-degree video frame 400 corresponding to the viewport 460. Examples of projection techniques include rectilinear projection (e.g., as discussed in JVET-D1030), stereographic projection, cylindrical projection, or other suitable projection technique. In some examples, the region on the sphere that corresponds to a viewport can include the region enclosed by the four segments of four great circles.

In various examples, a captured 360-degree video frame can be mapped to a TSP geometry, an equirectangular format, a cubical geometry, a cylindrical geometry, a pyramidal geometry, or any other suitable geometric shape for coding, transmission, and/or storage. In some cases, the geometric shape can be packed into a 2D video frame using a frame packing structure. The geometric shape can then be mapped to the spherical space and used by a 360-degree video display device to display the video. Once the 360-degree video frame 400 has been mapped to the spherical representation 410, the portion of spherical representation 410 that corresponds to the viewer's FOV (e.g., viewport 460) can be displayed by rendering the viewport 460. The viewer 420, using a 360-degree video display device, can view the portion of the spherical representation 410 from within the spherical representation. In most cases, the viewer 420 is positioned such that the "ground," from the viewer's perspective, is the bottom-most point of the spherical representation. In some cases, the equator of the spherical representation 410 is positioned at the viewer's eye level. In various implementations, the spherical representation 410 can be expanded or contracted to suit the height and/or position of the viewer 420 (e.g., if the viewer 420 is sitting, standing, or in some other position).

As noted above, one or more systems and methods are described herein for determining a viewport-aware quality metric for 360-degree video data that is mapped (projected) to one or more planes of a geometry. As noted above, a viewport refers to a particular view within a 360-degree scene. For example, multiple viewport representations can be generated for the 360-degree scene by capturing video frames from different viewpoints or orientations within the 360-degree scene. Each viewport representation is associated with a different viewport for the 360-degree scene. A sphere (e.g., spherical representation 410) can be defined that provides a spherical representation of the 360-degree scene. A viewer can view the sphere using a 360-degree video display device, such as a head-mounted display, a mobile device, and/or other suitable device.

One or more windows can be defined on the sphere. A window can be defined on the sphere based on a particular viewport representation. The window can represent a viewable region (an observable window) on the sphere. For example, the window can be defined based, at least in part, on a field of view (FOV) of a front face of the geometry to which the viewport representation is projected. Other factors can also be considered in defining a window. For example, a probability weighted observable window size can be computed for a window corresponding to a particular viewport representation. The probability weighted observable window size of the window can be computed based on the FOV of the front face of the geometry corresponding to the representation, an amount of separation between the window and one or more other windows of one or more other representation capturing views of the 360-degree scene, an estimated head rotational speed of a viewer of the 360-degree video data, a switching delay associated with switching between representations of the 360-degree video data, or any combination thereof. A viewport-aware quality metric of the video data within the window can then be determined. In some cases, multiple windows can be defined on the sphere, which correspond to some or all of the viewport representations captured for a 360-degree scene. Viewport-aware quality metrics can be determined for all of the windows. A combined viewport-aware quality metric can then be determined for the viewport representations.

Figure 5A:
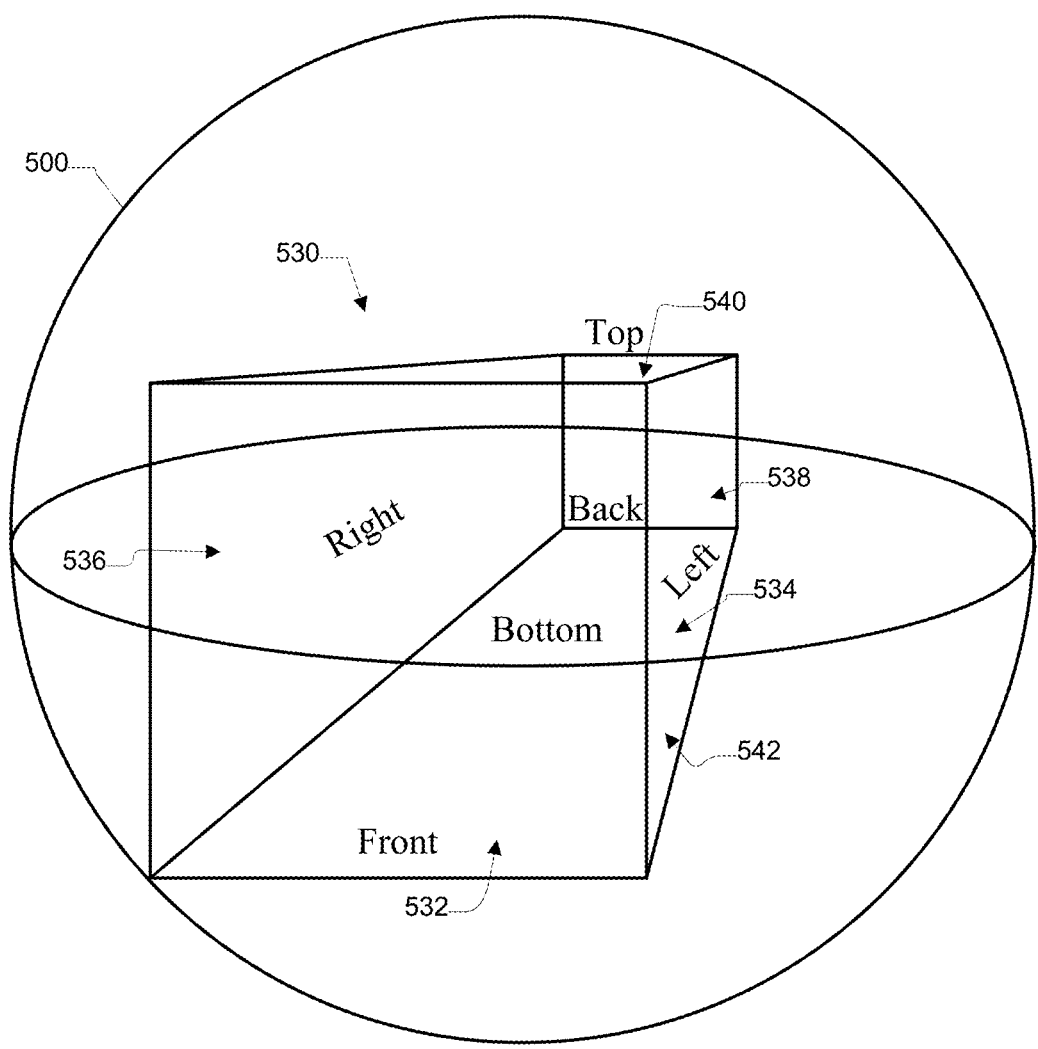
FIG. 5A illustrates an example of a virtual environment represented by a sphere geometry, where the pixels of the sphere have been mapped onto faces of a truncated square pyramid shape, in accordance with some examples.

Any suitable geometry can be used for projection of the spherical video of the 360-degree video data. One illustrative example is a truncated square pyramid. TSP projection is described in U.S. patent application Ser. No. 15/253,447, filed on Aug. 31, 2016, which is hereby incorporated by reference herein in its entirety, for all purposes. A full 360-degree video frame may contain a large amount of data, and in some cases, more data than a viewer can see at any given moment. Thus, in various implementations, the spherical video data, or the six faces provided by a cube, can be mapped to the six faces of the TSP geometry. FIG. 5A illustrates an example of a virtual environment represented by a sphere 500 that is mapped to a TSP geometry 530. As shown, the TSP geometry 530 is a square pyramid whose top has been cut off, and thus has a square base (front face 532), a square top (back face 538), and four trapezoid-shape sides (right face 536, left face 534, bottom face 542, and top face 540). Mathematically, a truncated square pyramid is described as a pyramidal frustum for a square pyramid.

A 360-degree video frame can include 360-degrees' worth of pixel data, and thus is spherical in shape. By mapping the spherical video data of the sphere 500 onto the planes provided by the TSP 530, the total size of the 360-degree video frame can be reduced while sacrificing some fidelity at the edges of the viewer's field of view. For instance, as shown in FIG. 5A, the pixels in the sphere 500 can be mapped directly onto the six faces of the TSP geometry 530. In some cases, the pixels in the sphere 500 can be mapped onto the six faces of a cube geometry, and then mapped from the cube geometry to the TSP geometry 530. In various implementations, other three-dimensional shapes can be used to represent the spherical frame data. In this example, the six faces represent full-frame video; that is, all 360-degrees of view from a particular orientation are represented.

In some cases, the planes of the TSP 530 can be oriented such that the base (the largest face) of the TSP represents a front view and the top (the smallest face) of the TSP represents a back view. As used herein, the faces of the TSP 530 can be referred to relative to the direction in which a viewer is looking when viewing a particular video frame. For instance, the base of the TSP is referred to as the front face 532, the top of the TSP is referred to as the back face 538, and the sides of the TSP are referred to as the right face 536, the left face 534, the top face 540, and the bottom face 542. Using these designations, the front face 532 is considered "front" because it is the direction a viewer is assumed to be facing, with the left face 534 being to the viewer's left, the right face 536 being to the viewer's right, and so on. In some examples, the front face 532 of the TSP (corresponding to a front view) can be captured at full resolution, the back face 538 (for a back view) can be captured at reduced resolution, and the right face 536, left face 534, top face 540, and bottom face 542 can be captured at decreasing resolutions (in a tapered manner from front to back).

In some cases, at least six full TSP mappings (one per cube face) are needed to represent the full sphere 500. In some examples, the TSP mappings may overlap to generate a better representation of the sphere 500 and viewing experience. For example, as shown in FIG. 5D, 30 TSP mappings can be generated for different views or orientations of the sphere. As described in more detail below, a video transmission device (e.g., encoding device 104 or other suitable device) can transmit, or a player device can play, a first viewport representation (corresponding to a first TSP map) that has the highest quality face (the front face of the TSP) corresponding to the viewer's current field of view. The video transmission device and/or the player device can switch to a second viewport representation (corresponding to a second TSP map) depending on the viewer's head orientation in order to provide a new representation with a high quality front face of the TSP for the new orientation within the sphere 500. If the transmission or switching of the second viewport representation (with the second TSP map) is delayed, the viewer may be presented with the first viewport representation (with the first TSP map) until the second viewport representation (with the second TSP map) arrives. In such an example, depending on the viewer's head orientation and the TSP map, the quality experienced may be reduced until the second TSP map is received.

Figure 5B:
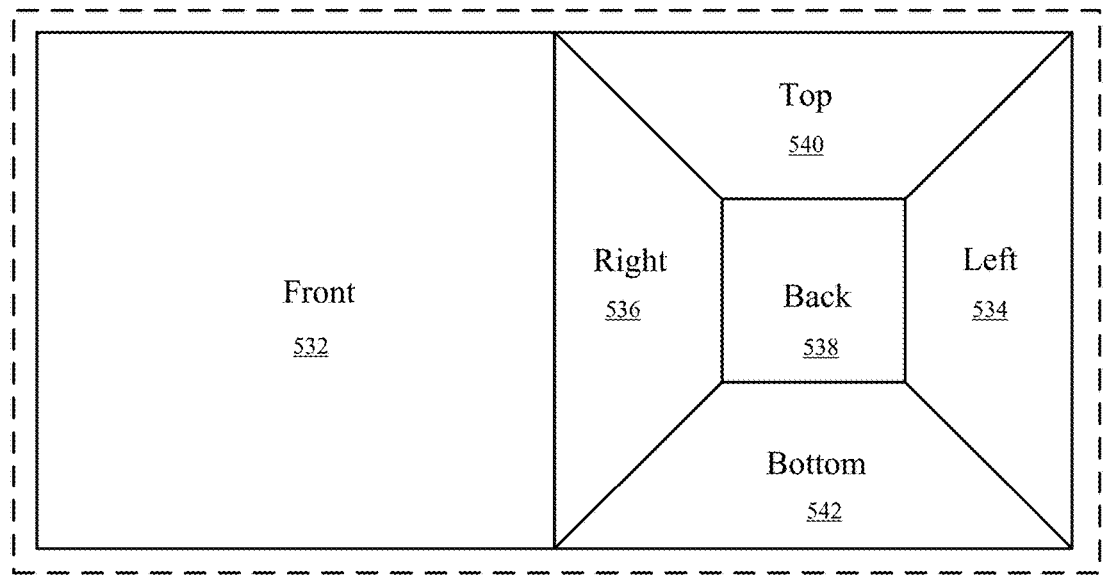
FIG. 5B illustrates an example of a frame packing structure for a frame of video data that has been mapped to a truncated square pyramid shape, in accordance with some examples.
Figure 5C:
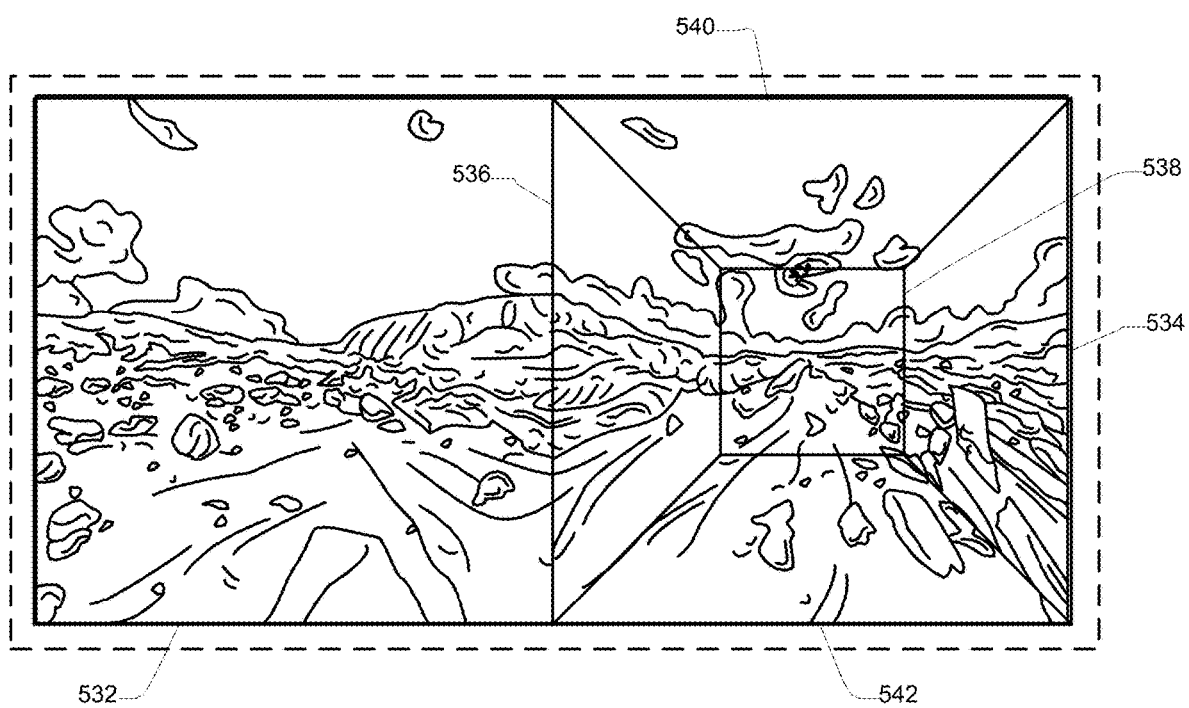
FIG. 5C illustrates an example of a frame that has been packed according to the example frame packing structure illustrated in FIG. 5B, in accordance with some examples.
Figure 5D:
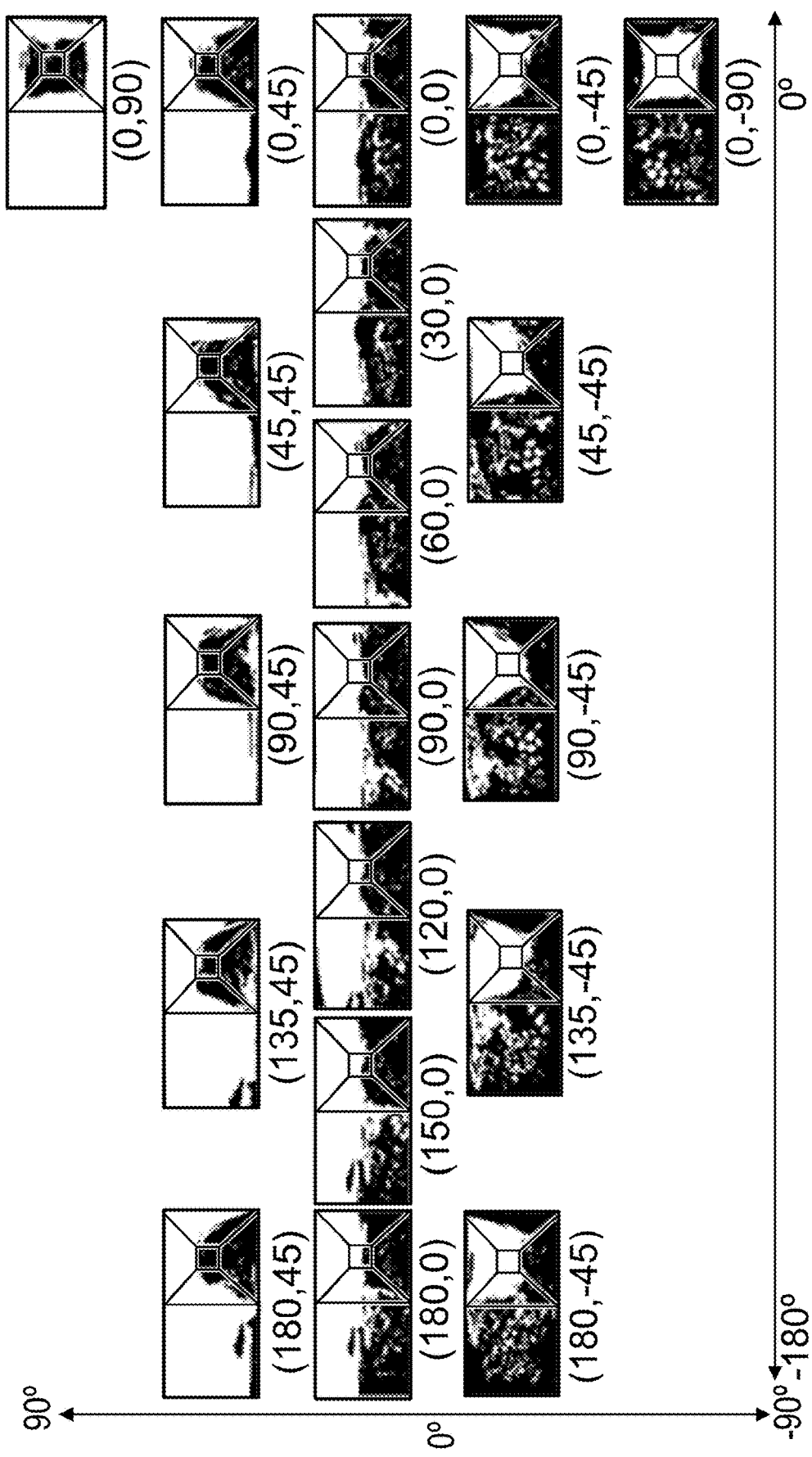
FIG. 5D illustrates an example of a number of TSP mappings corresponding to viewport representations for a 360-degree scene projected onto a truncated square pyramid geometry, in accordance with some examples.
Figure 5D:
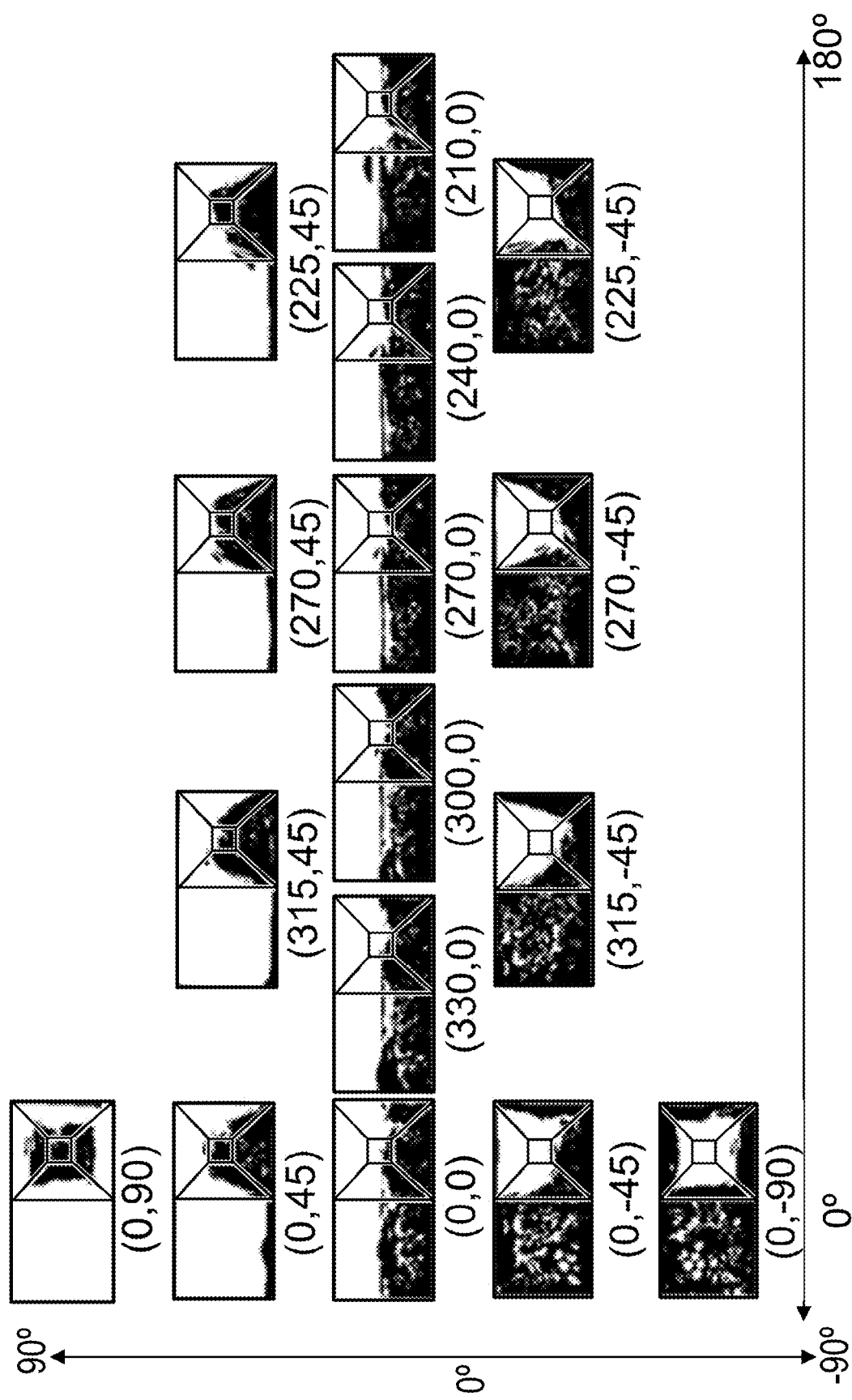

FIG. 5B is a diagram illustrating an example of a frame packing structure for a frame of video data that has been mapped to a TSP geometry. FIG. 5C is an example of a video frame that has been packed according to the example frame packing structure illustrated in FIG. 5B. A frame packing structure can define the format for packing the data for a video frame into a single block of data that can be stored, transported, and processed by a video decoder. That is, the frame packing structure can indicate which data should be located at which point in the data block. In the example frame packing structure shown in FIG. 5B, the warped sides of the TSP (the right face 536, the left face 534, the top face 540, and the bottom face 542) are grouped around the back face 538, and are all situated next to the front face 532. For example, the data for the left face 534, right face 536, top face 540, and bottom face 542 have been packed around the data for the back face 538. As shown, the left face 534 has been placed adjacent to the left edge of the back face 538 (which appears in the figure to be on the right edge of the back face 538, since the back face 538 is shown as a mirror image in the figure). Similarly, the right face 536 is placed adjacent to the right edge of the back face 538. The top face 540 is packed above the back face 538, and the bottom face 542 is packed below the back face 538 view. In some cases, the data of the left 534, right 536, top 540, and bottom 542 faces may be warped to fit into a square or rectangular data block. In various implementations, the size of the back face 538 can also be adjusted. For example, the back face 538 can be $\frac{1}{4}^{th}$ of the size, $\frac{1}{16}^{th}$ of the size, or other fraction, of the front face 532. The combined data for the left face 534, right face 536, top face 540, bottom face 542, and back face 538 can be packed into the frame packing structure shown in FIG. 5B next to the data for the front face 532, which is preserved at full resolution. Using this example frame packing structure, the data for a frame can be packed into a rectangular-shaped block of data.

The transitions between the front face 532 and the various warped sides are continuous (e.g., as a user changes head orientation). In FIG. 5B, the striped lines represent a frame boundary extension that may be required before encoding the frame to avoid transition artifacts across the frame boundaries. As noted above, one advantage of the TSP geometry is the smooth quality transitioning from the front face 532 (having the highest quality) towards the back face 538 (having the lowest quality), with the tapered right face 536, left face 534, top face 540, and bottom face 542 having decreasing quality as the geometry of such faces moves from the front face 532 to the back face 538.

In various implementations, a frame packed according the frame packing structure such as is illustrated in FIG. 5B can include information (e.g., a flag, a field, and/or a code) that indicates the packing structure used in the frame. A decoding device can use the indicated packing structure to identify video data located at a particular point in the data block that represents a frame.

Once packed as described above, the frame of video data can be processed for storage and/or transmission. For example, the frame can be encoded, compressed, and/or encapsulated. Each frame of 360-degree video data can be packed in a similar fashion, and the packed frames can be packed in sequence in a bitstream. The bitstream can be stored and/or transmitted.

The resolution of the TSP front face 532 is the same as a front face of a cube geometry and can represent any other viewport orientation within the sphere. Table 1 below presents examples of TSP decoding resolutions corresponding with 4K, 6K, and 8K equirectangular projection (ERP) resolutions and corresponding resolutions using a TSP geometry.

TABLE 1

| Video Frame Resolution (Decode) | |
|---|---|
| ERP | TSP |
| 3840 × 1920 (4K) | 1920 × 960 |
| 5760 × 2880 (6K) | 2880 × 1440 |
| 7680 × 3840 (8K) | 3840 × 1920 |

As shown, the TSP resolution is 75% of corresponding 4K, 6K, 8K ERP resolution. For example, the TSP pixel count is reduced by 75% compared with ERP. This significantly reduces the decoder requirements or, conversely, a 3840×1920 decoder would be capable of decoding the equivalent of 8K ERP resolution. Since a TSP based viewport scheme switches between bit streams, as described below, a single decoder session is sufficient.

As noted above, in some implementations, the pixels in the sphere 500 can be mapped onto the faces of a cube geometry, and then mapped from the cube geometry to the TSP geometry. Table 2 below shows examples of forward and inverse warping equations used for mapping from cube faces to TSP faces and from TSP faces to cube faces. The (x,y) coordinates are the coordinates inside the TSP map (the frame packed with the mapped TSP faces). The coordinates (x',y') inside a single cube map face have normalized ranges [0.0,1.0]. In one example implementation, the back face is subsampled by 4 horizontally and vertically. An example of the back TSP face is the back face 538, an example of the right TSP trapezoid is the right face 536, an example of the left TSP trapezoid is the left face 534, an example of bottom TSP trapezoid is the bottom face 542, and an example of top TSP trapezoid is the top face 540. As noted above, the front face of the TSP (the front face 532) is the same as the front face of the cube, in which case no warping or mapping is needed.

TABLE 2

| Forward equations (cube faces to TSP) | Inverse equations (TSP to cube faces) |
|---|---|
| Right TSP trapezoid from right cube face: <br> $x' = (x - 0.5)/0.1875$ <br> $y' = (y - 2.0x + 1.0)/(3.0 - 4.0x)$ | Right cube face from right TSP trapezoid: <br> $x = 0.1875x' + 0.5$ <br> $y = 0.375x' - 0.75x'y' + y'$ |
| Left TSP trapezoid from left cube face: <br> $x' = (x - 0.8125)/0.1875$ <br> $y' = (y + 2.0x - 2.0)/(4.0x - 3.0)$ | Left cube face from left TSP trapezoid: <br> $x = 0.1875x' + 0.8125$ <br> $y = 0.25y' + 0.75x'y' - 0.375x' + 0.375$ |
| Bottom TSP trapezoid from bottom cube face: <br> $x' = (1.0 - x - 0.5y)/(0.5 - y)$ <br> $y' = (0.375 - y)/0.375$ | Bottom cube face from bottom TSP trapezoid: <br> $x = 0.1875y' - 0.375x'y' - 0.125x' + 0.8125$ <br> $y = 0.375 - 0.375y'$ |

TABLE 2-continued

| Forward equations (cube faces to TSP) | Inverse equations (TSP to cube faces) |
|---|---|
| Top TSP trapezoid from top cube face:<br>x' = (0.5 − x + 0.5y)/(y − 0.5)<br>y' = (1.0 − y)/0.375<br>Back TSP face from back cube face:<br>x' = (x − 0.6875)/0.125<br>y' = (y − 0.375)/0.25 | Top cube face from top TSP trapezoid:<br>x = 1.0 − 0.1875y' − 0.5x' + 0.375x'y'<br>y = 1.0 − 0.375y'<br>Back cube face from back TSP face:<br>x = 0.125x' + 0.6875<br>y = 0.25y + 0.375 |

FIG. 5D is a diagram illustrating an example of TSP mappings corresponding to viewport representations for a 360-degree scene projected onto a TSP geometry. As shown, 30 TSP maps are generated for different views or orientations of the sphere representing the 360-degree scene. For example, multiple viewport representations can be generated for the 360-degree scene by capturing video frames from different viewpoints or orientations within the 360-degree scene. Each viewport representation is a stream of video frames captured from a particular view within a 360-degree scene, and is thus associated with a different viewport for the 360-degree scene. Each of the viewport representations can correspond to a different TSP map, such as one of the 30 TSP maps shown in FIG. 5D. For example, the 360-degree frames of each viewport representation are mapped to a TSP geometry (as shown in FIG. 5A) and can be packed into a frame (as shown in FIG. 5B). Each of the 30 TSP maps (corresponding to a particular viewport representation) shown in FIG. 5D are from a different orientation in the 360-degree scene and provide a different front face having a high quality for the given orientation. For example, TSP map 550 is at an orientation of (180°, 45°) relative to a reference point in the scene, and includes a front face with a high quality representing video data of the scene at the orientation. All together, the 30 TSP maps provide 360° view of the entire 360-degree scene.

While TSP maps are shown in FIG. 5D as illustrative examples of geometric maps to which video frames of viewport representations can be mapped, one of ordinary skill will appreciate that other geometric maps can also be used, such as cube maps, cylindrical maps, or other suitable geometric map.

Figure 6:
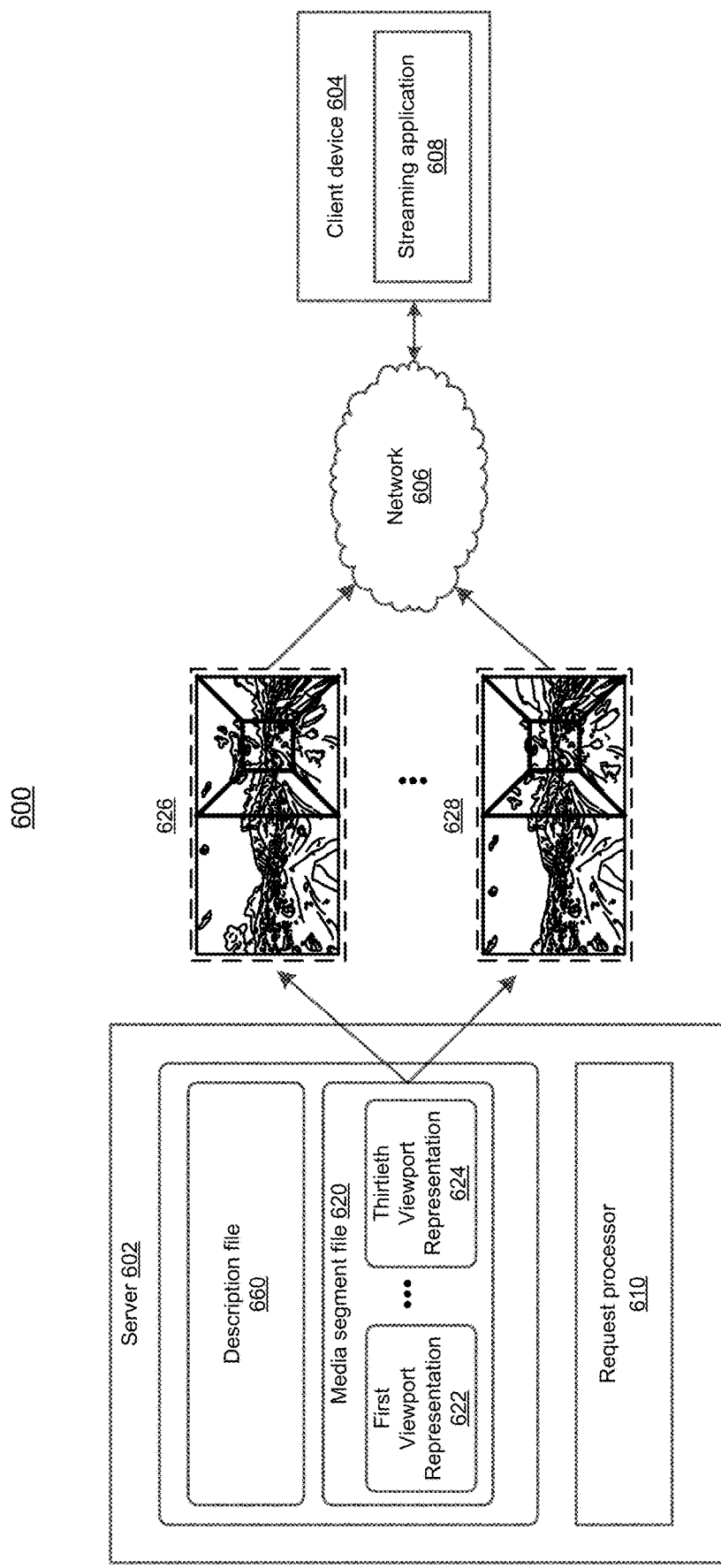
FIG. 6 is a diagram illustrating an example system for media streaming, in accordance with some examples.

FIG. 6 is a diagram illustrating an example of a viewport-aware 360-degree video system 600. The viewport-aware 360-degree video system 600 targets delivery of high resolution 360-degree video (e.g., 4K video or the like) within the bandwidth and decoding constraints imposed by networks and video decoders. Viewport-based schemes have a number of additional factors and/or parameters, as compared to the non-viewport based schemes, that affect the delivered video quality.

The viewport-aware 360-degree video system 600 can deliver to a 360-degree video display device the viewport representation (e.g., represented by a geometric map, such as a TSP map) with 360-degree video data representing a viewport on a sphere that is closest to a viewer's field-of-view (FOV) at full quality (e.g., at full resolution), with the remaining portion of the 360-degree video data for the viewport being provided at a lower quality. For example, the viewport representation that has the TSP map with a front face (e.g., front face 532) corresponding to the viewer's FOV can be provided to and rendered by the 360-degree video display device. The sphere can be covered by multiple viewports, allowing seamless switching between the viewport representations based on a head orientation and/or position of the viewer. In some cases, the multiple viewports can be overlapping on the sphere. A switch between viewport representations (e.g., a switch between two of the TSP maps shown in FIG. 5D) can occur as the viewer's head orientation crosses one or more viewport switching boundaries.

An alternative approach could be to transmit the full 360-degree video content to the viewer. In such an approach, all possible viewports are available simultaneously to the viewer even though the viewer's head position is facing in one particular direction (defining the current viewport). Such an approach requires a large amount of transmission bandwidth among other resources, due to video data being provided that the viewer may not view. The viewport-aware 360-degree video system 600 can be used to save transmission bandwidth by limiting the content that is transmitted to only the video data needed for the current viewport. The viewport-aware 360-degree video system 600 and/or the client device 604 can switch to transmitting a different viewport when the viewer's head position is changed.

Switching between viewport representations can occur at random access point (RAP) pictures (or IRAP pictures). In order to achieve fast switching between video tracks, time aligned periodic RAP pictures with a certain period (e.g., a 1 second period, a 1.5 second period, a 2 second period, or any other suitable period) are inserted. For DASH streaming (e.g., using the system 600 shown in FIG. 6), segments or sub-segments can be aligned with the RAP pictures. During switching, the viewer can continue viewing the previous viewport representation until the arrival of the viewport representation corresponding to the current viewport (e.g., the last track requested by the viewer or player). Using the TSP geometry as an example, the video data mapped to a trapezoidal side of the TSP map (which is at a reduced quality compared to the front face of the TSP) can be displayed until a current viewport representation is received and rendered for display. The switching delay (or switching duration) can be determined by the RAP period, the amount of playback buffering in the client, among other factors. For a given average switching delay, the geometry and/or projection used, the number and the distribution of the viewports, and the head rotational speed can be used to determine the viewable region on the sphere.

Referring to FIG. 6, the viewport-aware 360-degree video system 600 includes a server 602 and a client device 604 communicatively coupled with each other over network 606 based on a networking protocol. In one illustrative example, the server 602 can include a conventional HTTP web server, and the client device 604 can include a conventional HTTP client. In such an example, an HTTP communication channel can be established, in which case the client device 604 can transmit an HTTP request to the server 602 to request a viewport representation. The server 602 can transmit an HTTP response back to client device 604 including the requested viewport representation mapped to a geometric map (e.g., a TSP map, cube map, volumetric map, or the like). In some cases, a viewport representation can be divided into media segments. A media segment can include a sequence of video frames. Client device 604 may include a streaming application 608 to establish a streaming session with server 602 over network 606. During the streaming session, streaming application 608 can transmit a request for one or more media segments of a viewport representation to a request processor 610 of server 602 over network 606. The streaming application 608 can receive the requested one or more media segments, and can render some or all of the received media segments on client device 604. Using such HTTP streaming, the streaming application 608 does not need to wait until the entire media content has been completely downloaded before rendering the media content at client device 604, which can facilitate better utilization of the network resources and improve user experience.

The server 602 can provide multiple viewport representations of the same 360-degree scene that differ by having better quality for different portions and/or orientations within the 360-degree scene. The server 602 can transmit (via network 606) a number of viewport representations for a given media segment file. Each viewport representation corresponds to a different geometric map (e.g., TSP map). For example, a media segment file 620 can include 30 viewport representations, including a first viewport representation 622 through a thirtieth viewport representation 624. Using FIG. 5D as an example, each of the 30 viewport representations can correspond to a different one of the 30 TSP maps. A first viewport representation 622 (corresponding to a first TSP map) that has the highest quality front face corresponding to the viewer's current field of view can be sent by the server 602 to the client device 604. The frame 626 (packed using a TSP geometry) is an example of a frame from the first viewport representation 622. The server 602 or the client device 604 can switch to another viewport representation (e.g., the thirtieth viewport representation 624) as the head of the user moves to a different portion of the sphere. The frame 628 (packed using a TSP geometry) is an example of a frame from the thirtieth viewport representation 624.

In some cases, multiple media segment files can be maintained by the server 602. For example, each media segment file can relate to a certain time point and duration of a full media file. Information related the media segment files can be part of a description file 660 (or manifest file) maintained by the server 602. The client device 604 can obtain the description file 660 from the server 602, and can transmit requests for certain viewport representations of a certain media segment file based on the description file 660. The description file 660 may include, for example, a list of a set of viewport representations for each media segment file, and the properties associated with each viewport representation (e.g., orientation, resolution, bitrate, frame rate, resolution, audio language, etc.). The description file 660 can also include location identifiers (e.g., Uniform Resource Locator (URL), Uniform Resource Indicator (URI), etc.) associated with the storage locations of the alternative media segment files. Various protocols can be used by the viewport-aware 360-degree video system 600. One example includes Dynamic Adaptive Streaming over HyperText Transfer Protocol (HTTP), or DASH (defined in ISO/IEC 23009-1:2014). DASH, which is also known as MPEG-DASH. Under DASH, the description file 660 can include a media presentation description (MPD).

Problems exist with respect to evaluating the quality of viewport switching systems (e.g., viewport-aware 360-degree video system 600). For example, one problem with evaluating the quality of viewport switching systems using certain geometries, such as TSPs, cube maps, or the like, is that such systems utilize multiple representations (each with a particular orientation within the 360-degree scene), and switch between them depending on the viewer's head orientation. For instance, as described above, each viewport representation represents a different front viewport with the best quality, for example with a 90-degree field of view (FOV), while the quality is lower for the remainder of the sphere. The rationale is that the viewer is most likely to observe the front viewport and some parts of the adjacent regions before a client device switches to the viewport representation with a front viewport orientation that is closer to the viewer's new head orientation.

The quality metric described herein includes a viewport-aware quality metric for 360-degree video. As described above, a viewport refers to a particular view within a 360-degree scene. Multiple viewport representations can be generated for a 360-degree scene by capturing video frames from different viewpoints or orientations within the 360-degree scene, where each representation is associated with a different viewport for the 360-degree scene. The viewport-aware quality metric can be determined based on one or more windows defined on the sphere that provides a spherical representation of the 360-degree scene. The viewport-aware quality metric (or combined viewport-aware quality metric) indicates a quality of the 360-degree video data when mapped to the geometry. For example, the viewport-aware quality metric can represent a comparison between the original 360-degree video and the coded 360-degree video. Such a metric is valuable due to the error in the geometric domain not reflecting the error on the sphere because of the reverse mapping required to get back the points on the sphere.

Figure 7:
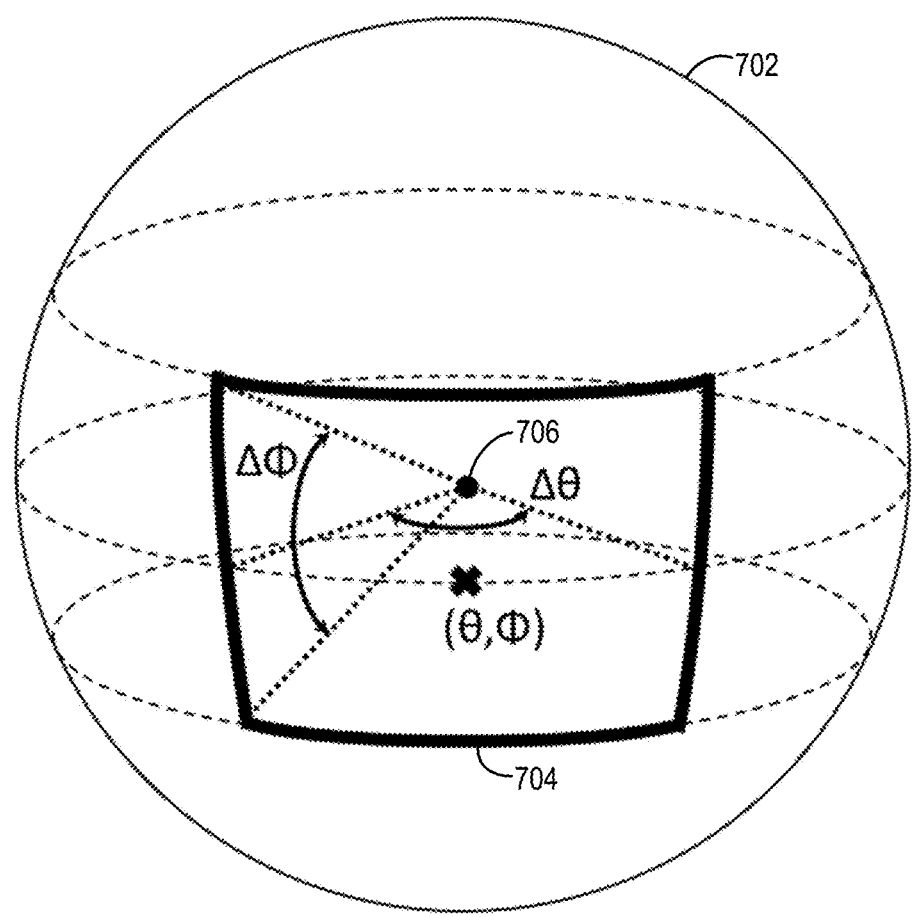
FIG. 7 is a diagram illustrating an example of a window defined on a sphere geometry representing a 360-degree video scene, in accordance with some examples.

FIG. 7 is a diagram illustrating an example of a window 704 defined on a sphere 702 representing a 360-degree video scene. The window 704 can be used to compute the viewport-aware quality metric, as described in more detail further below. The window 704 can be defined on the sphere 702 based on the viewport representation for which the window is being defined. For example, the window 704 can be defined based, at least in part, on a FOV of a front face of the geometry to which the viewport representation is projected. Using a TSP as an example, the front face of the TSP (e.g., front face 532 of TSP 530), which corresponds to the highest resolution portion of the 360-degree video data of the viewport representation, can be used to define the window for that viewport representation. For example, the window 704 can be centered on the front face of the geometric map (e.g., a TSP map) for each viewport representation, and the computation of the viewport-aware quality metric for the window 704 is restricted to the video data on the sphere that is within the window 704.

In some examples, as shown in FIG. 7, for a front face of a geometry (e.g., TSP, cube, etc.) with an orientation pitch $\Phi$ and yaw $\theta$, the window with size ($\Delta\theta$, $\Delta\Phi$) for computing the viewport-aware quality metric is defined by the intervals $[\Phi-\Delta\Phi/2, \Phi+\Delta\Phi/2]$ and $[\theta-\Delta\theta/2, \theta+\Delta\theta/2]$, as illustrated in FIG. 7. The ($\theta$, $\Phi$) (shown at the x in FIG. 7) represents the orientation of the center of the front face of the geometry (e.g., the center of the front face 532 of the TSP 530) relative the center 706 of the sphere. In some cases, the window sizes in this comparison can range from 90° to 180° for pitch and 90° to 360° for yaw. The pitch $\Phi$ and the yaw $\theta$ can be known for each viewport representation, for example, based on a known orientation that the viewport representation corresponds to in the 360-degree scene. The parameters defining the size, which include ($\Delta\theta$, $\Delta\Phi$) defining the width and the height of the window, can be determined based on various factors, as described below.

Figure 8B:
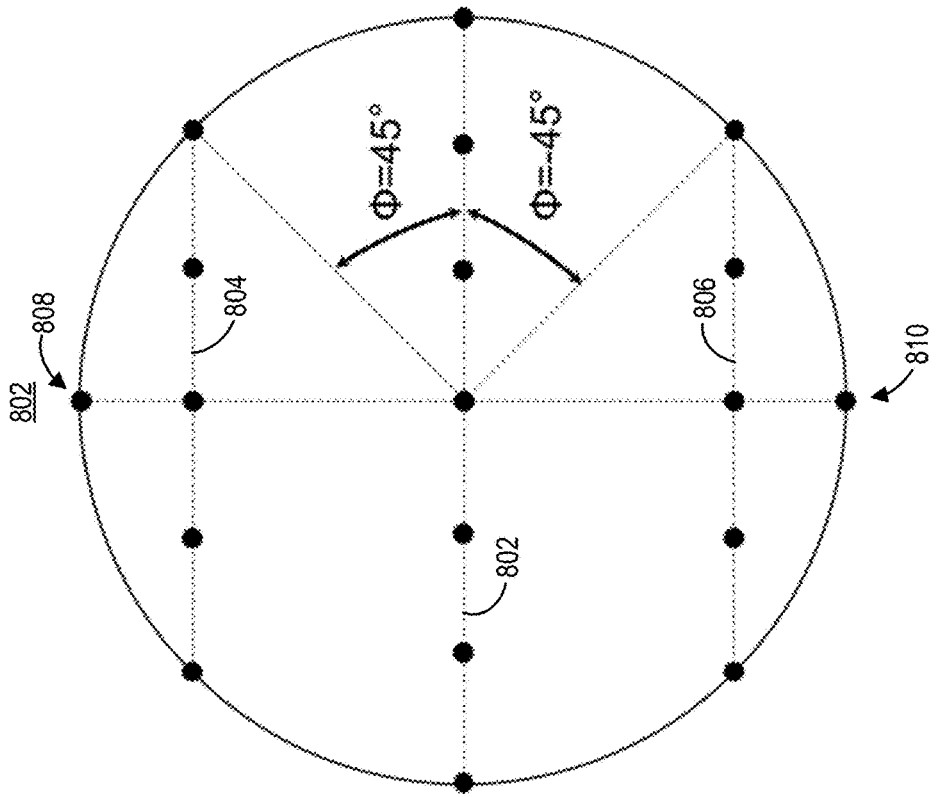
FIG. 8B is a diagram illustrating a side view of the example sphere geometry with window centers for evaluating a viewport-aware quality metric, in accordance with some examples.
Figure 8A:
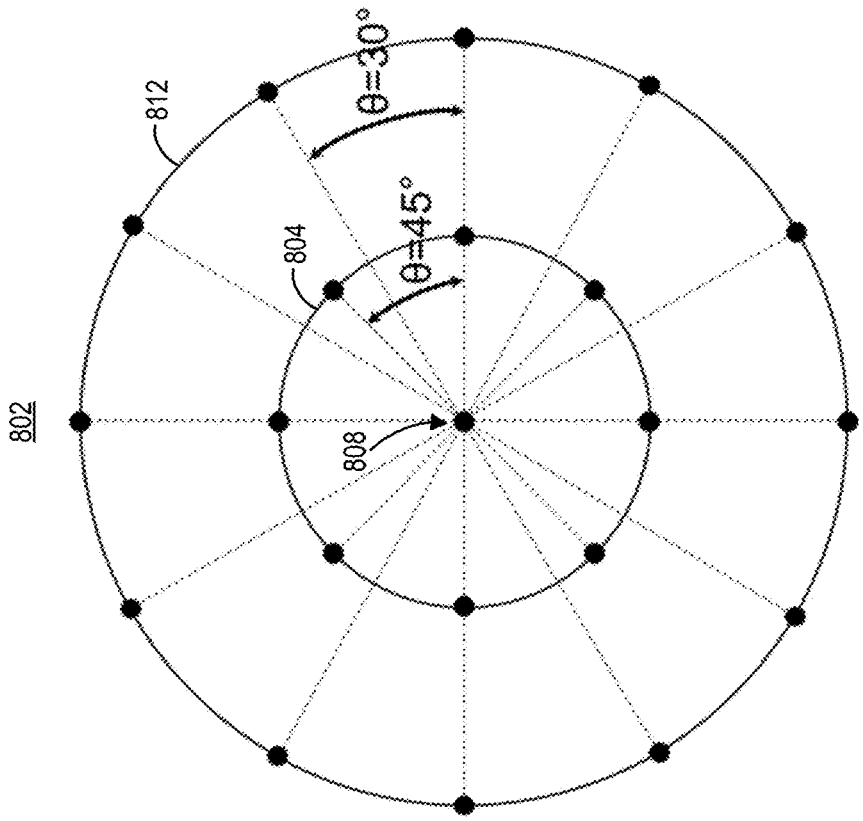
FIG. 8A is a diagram illustrating a top view of an example sphere geometry with window centers for evaluating a viewport-aware quality metric, in accordance with some examples.
Figure 9:
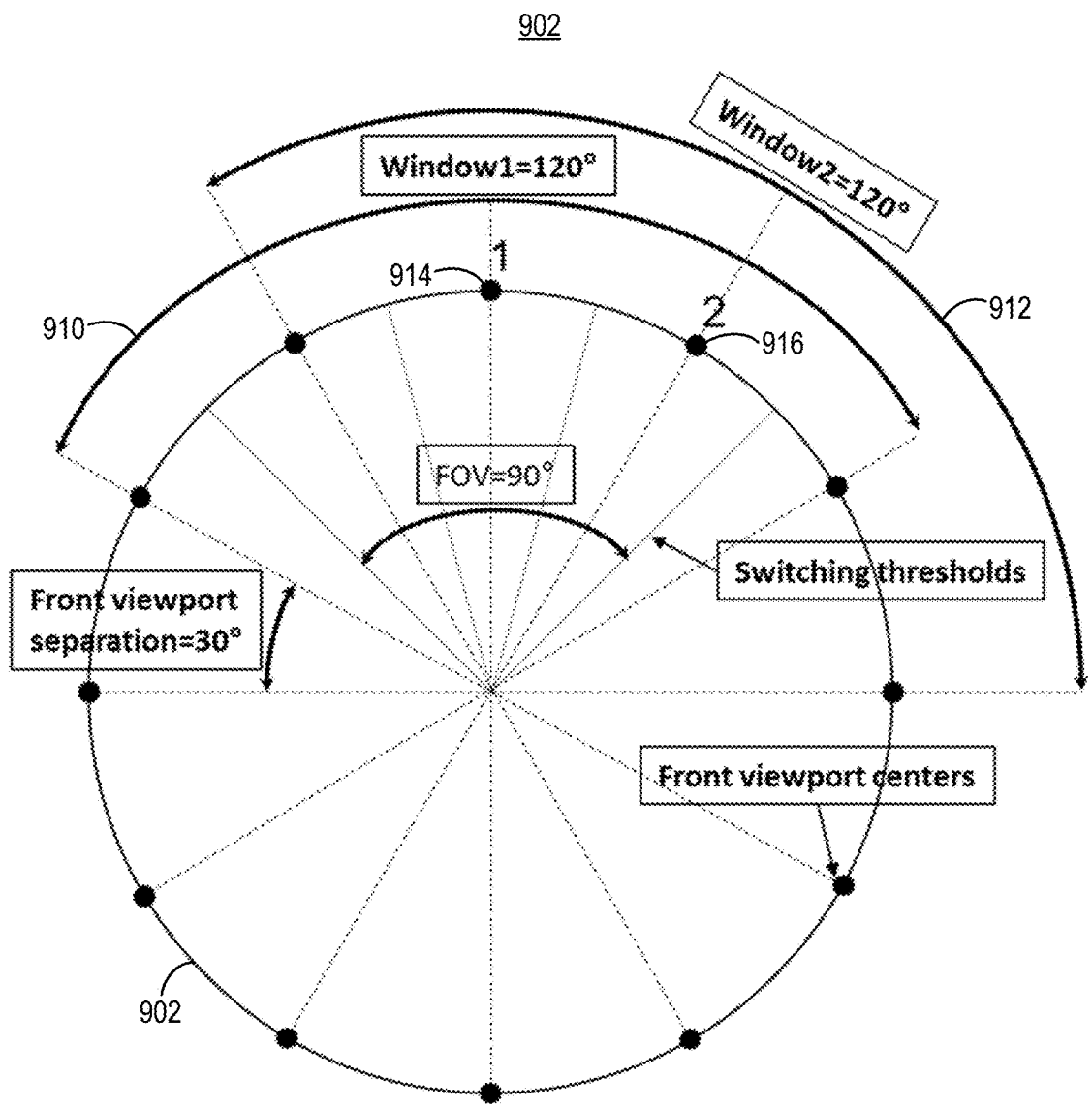
FIG. 9 is a diagram illustrating a top view of an example sphere geometry with two windows defined for two viewport representations, in accordance with some examples.

In some cases, multiple windows can be defined on the sphere, and viewport-aware quality metrics can be determined for all of the windows. The multiple windows can correspond to some or all of the viewport representations available for a 360-degree scene. Using FIG. 5D as an example, 30 windows can be defined on the sphere 702, with one window being defined for each TSP map (and thus for each of the 30 viewport representations capture video of the 360-degree scene). The windows can be overlapping on the sphere, as shown in FIG. 9 (described below). FIG. 8A and FIG. 8B are diagrams illustrating the distribution of the front-face geometry centers of the different viewport representations. FIG. 8A shows a top view of a sphere 802 with window centers (represented as dots) for evaluating a viewport-aware quality metric. FIG. 8B shows a side view of the sphere 802 with window centers (represented as dots).

In the example shown in FIG. 8A and FIG. 8B, there are a total of 30 viewport representations, in which case there are 30 windows defined on the sphere. Each dot represents the center of a front face of a geometry to which the viewport representation is mapped. As shown, there are 12 representation windows on the equator (represented by line 812), 8 representation windows at pitch +45° (represented by line 804), 8 representation windows at pitch −45° (represented by line 806), and 1 representation window at each of the poles (one representation window at pole 808 and one representation window at pole 810). Any other suitable distribution of windows on the sphere 802 could be used. For instance, another example of a distribution (not shown) includes 50 representations, where 10 representation windows could be placed at pitch angles +30° and −30°, and 8 representation windows could be placed at pitch angles +60° and −60°, in addition to the 12 representation windows on the equator and the 2 representation windows at the poles.

FIG. 9 is a diagram illustrating a top view of a sphere 902 with two windows (a first window 910 denoted as Window1 and a second window 912 denoted as Window2) defined for two different viewport representations. The diagram in FIG. 9 illustrates the window that a viewer is likely to observe with equal probability if there is no preferred or probable direction for head rotation. The first window 910 corresponds a front face of a geometry (e.g., a TSP, cube, or the like) to which frames of a first viewport representation are mapped. The second window 912 corresponds a front face of a geometry (e.g., a TSP, cube, or the like) to which frames of a second viewport representation are mapped. The center of the first window 910 (representing the center of the front face of the geometry to which the first viewport representation is mapped) is shown with a dot 914 with the numeral 1. The center of the second window 912 (representing the center of the front face of the geometry to which the second viewport representation is mapped) is shown with a dot 916 with the numeral 2.

In the example shown in FIG. 9, the separation between the front faces of the viewport representations is 30°. Any other suitable separation between viewport representations can be used. Switching thresholds are located at angles in the middle between adjacent viewport representations. Based on these examples, a viewer can rotate +/−15° before a switch happens to an adjacent representation, assuming there are no switching delays. If the field of view (FOV) of the front face of the geometry (for a viewport representation) is 90°, the viewer can potentially observe a 120° window in this example (the first window 910 in FIG. 9). After the switch (when the viewer rotates to the switching threshold halfway between dot 914 and dot 916), a new 120° window (the second window 912 in FIG. 9) is potentially observable before the next switch happens. As shown, the 120° windows are overlapping in FIG. 9, so that a FOV is always included inside a window when a switch happens.

In some examples, when zero switching delay is assumed, the window size is defined in degrees (valid for pitch and yaw) as being equal to the sum of the FOV of the front face of the geometry (e.g., front face 532) and the separation between the viewport representations. For example, referring to FIG. 9, each of the first window 910 and the second window 912 has a FOV of 90°, and the separation between each viewport representation is 30°. In such an example, the first window 910 and the second window 912 can be determined to have sizes of 120° (90° FOV+30° front viewport separation) for both pitch and yaw. Using the notation from FIG. 7, the change in yaw (Δθ), representing width, and the change in pitch (ΔΦ), representing height, can both be set to 120°. As described below, a viewport-aware quality metric can be computed for such a window centered on each viewport representation.

In real-world scenarios, the switching delay for switching between viewport representations is nonzero, in which case the window size can be made larger than the computed observable window for zero switching delay. In such cases, the size of a window for a viewport representation can be based on the FOV of the front face of the geometry (e.g., front face 532), the separation between the viewport representations, and also based on factors associated with the switching delay. The switching delay has several contributing factors. One contributing factor is the RAP period (or IRAP period for intra coded pictures), because the switching can only occur at RAP (or IRAP) pictures. A second contributing factor to switching delay is the frame period, which is the period needed to render a video picture or frame. The frame period contributes to switching delay because the switching occurs when a new picture is rendered at the next frame interval. The frame period can be much smaller than the IRAP period. For example, for a 30 frame per second video, it can take 33 milliseconds to render a frame, whereas the IRAP period may be a full second or other similar value. A third contributing factor is a possible buffering delay.

In some cases, the observable window size can also depend on the head rotational speed of the viewer (in degrees/sec), because for a given head rotational speed, the viewer will observe more or less of the sphere before the switch happens as compared to other head rotational speeds. In an extreme example, it is possible that the viewer can observe the entire sphere (a 360° window) before switching.

Based on the above-described factors, a probability weighted observable window size can be computed as follows:

$$window\_size = FOV + front\_viewport\_separation + rotational\_speed \times switching\_delay \times 2,$$

where FOV represents the FOV of the front face of the geometry (e.g., front face 532) to which a viewport representation is mapped (e.g., 90° in the example of FIG. 9), the front_viewport_separation represents the separation between the viewport representations (e.g., 30° in the example of FIG. 9), the rotational_speed represents the probability of the viewer's head rotational speeds, and the switching_delay represents the estimated switching delay based on the factors described above as contributing to switching delay between viewport representations. The value of 2 is used to account for the left and right/top and bottom window sides. The value can be set to any suitable value.

Each window size has a probability that the viewer will observe what is in the window before switching to another representation. For example, as the window size is changed, there is going to be a different probability that the viewer is going to view the content that is in the window. For instance, as the window gets bigger, the probability that a viewer will view the entire window will likely go down. This probability also depends on the probability of the viewer's head rotational speeds. For example, the probability can increase with decreasing head speeds (due to a smaller window size), and can decrease with increasing head speeds (due to a wider window size). Thus, window size can increase with increasing head speeds, and can decrease with decreasing head speeds. It is reasonable to assume that the viewer will more likely have lower head rotational speeds than very fast speeds. In one illustrative example, the probability distribution of the head rotational speeds can be an exponential distribution. In some cases, through experiments with many viewers, the statistical parameters of the probability distribution can be estimated. Based on this distribution, the probability of observable window sizes can be determined. For instance, a probability weight can determined based on statistics collected for head rotational speed distributions. In one example, the higher the head rotational speed, the wider the window size becomes, but the less probable it is that a viewer will observe what is in the window, leading to a smaller probability weight for that window size. A viewport-aware quality metric can then be computed based on the probability weighted observable window size centered on each representation.

In cases when multiple windows are defined for a sphere (e.g., for the multiple viewport representation TSP maps shown in FIG. 5D), a combined viewport-aware quality metric for the viewport representations can be determined. For example, a window can be defined for each viewport representation. A viewport-aware quality metric can be determined for each window using the video data of the sphere in each window. The various viewport-aware quality metrics for the windows can then be combined to determine a combined viewport-aware quality metric. In one illustrative example, the viewport-aware quality metrics for the windows can be averaged to determine the combined viewport-aware quality metric. In another example, a median viewport-aware quality metric from the viewport-aware quality metrics for the windows can be used as the combined viewport-aware quality metric.

An example of computation of the viewport-aware quality metric will now be described. As noted above, the error in the geometric (planar) domain does not reflect the error on the sphere because of the reverse mapping required to get back the points on the sphere. In some cases, a spherical metric can be used as the viewport-aware quality metric. In one illustrative example, a windowed Spherical-PSNR (S-PSNR) metric can be computed and used as the viewport-aware quality metric. Analysis based on the windowed S-PSNR allows the properties of the viewport representations to be quantified.

To compute the S-PSNR for a window on the sphere, a set of uniformly sampled points can be determined on the sphere that are within the window. A point on the sphere can be mapped to a corresponding location on a ground truth frame (e.g., the original video frame before being coded) and can also be mapped to a point on a coded picture (e.g., a frame packed using a TSP geometry). The mapping can be performed by applying any suitable mathematical projection that projects from a 2D frame to a sphere, and from a sphere to a 2D frame. The pixel values at the locations on the ground truth frame and on the coded picture can be computed, and the error between these pixels can be determined. The same process can be repeated for every sample point in a window on the sphere, and the resulting error for all of the points in the window indicates the S-PSNR for the window. A combined S-PSNR can be determined for all of the windows defined for the available viewport representations, which can be used to summarize the average quality over all possible viewports of a 360-degree scene provided by the viewport representations.

The viewport-aware quality metric (or combined viewport-aware quality metric) described herein indicates a quality of the 360-degree video data when mapped to certain geometries. For example, the viewport-aware quality metric can represent a comparison between the original 360-degree video and the coded 360-degree video, and thus indicates the coding efficiency of the 360-degree video data when mapped to a certain geometry. Using a TSP as an example, the coding efficiency of the different viewport representations, when mapped to a TSP geometry, can be provided based on the determined viewport-aware quality metric (or combined viewport-aware quality metric). The coding efficiency of a viewport switching mechanism using one type of geometry (for mapping 360-degree video data of the various viewport representations) can be compared to one or more other viewport switching mechanisms that use one or more other geometries.

Figure 10:
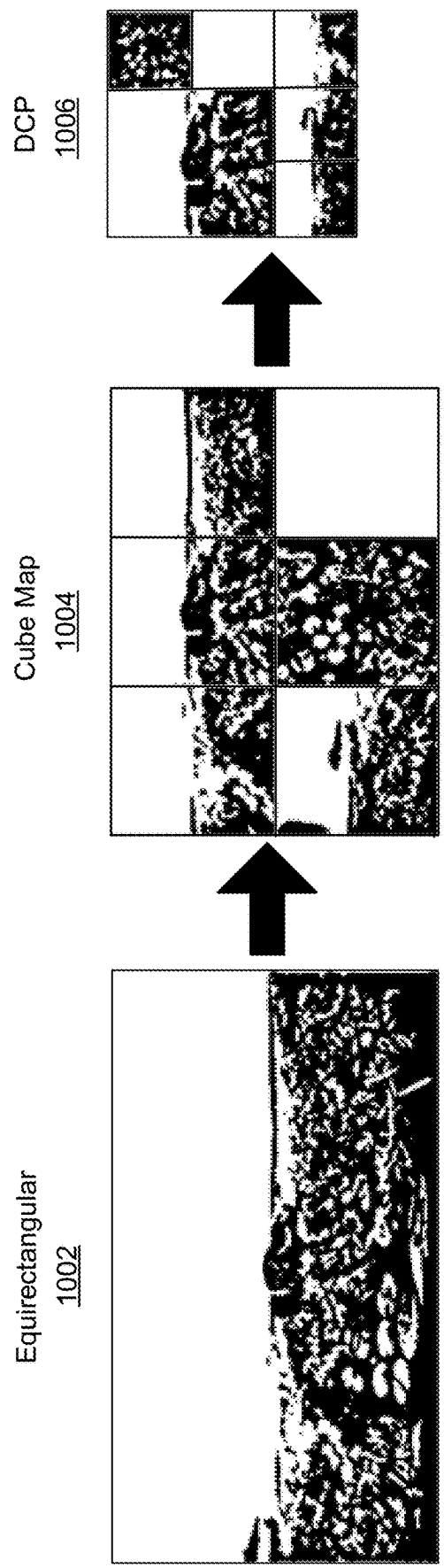
FIG. 10 is a diagram illustrating an example of a downsampled cube map projection (DCP), in accordance with some examples.

In one illustrative example, the TSP projection can be compared with a downsampled cube map projection (DCP). FIG. 10 is a diagram illustrating an example of a downsampled cube map projection (DCP). For example, 360-degree video data is mapped to an equirectangular frame 1002, and is packed in a frame as a cube map 1004 using a cube geometry. A downsampled cube map projected cube (DCP) map 1006 is then generated. The DCP frame packing structure is shown in the DCP map 1006. As for TSP, the front face of the DCP map 1006 is equivalent to the front face of the cube map 1004. The other faces of the DCP map 1006 can be downsampled by factor 2 horizontally and vertically. For DCP, 30 viewports can be generated with identical spherical distribution as used for TSP. Table 3 below enumerates the DCP frame resolution corresponding with ERP frame resolutions.

TABLE 3

| ERP | TSP | DCP |
| --- | --- | --- |
| 3840 × 1920 | 1920 × 960 | 1440 × 1440 |
| 4096 × 2048 | 2048 × 1024 | 1536 × 1536 |
| 4320 × 2160 | 2160 × 1080 | 1632 × 1632 |

As shown in Table 3, frame resolutions for ERP, TSP, and DCP encodings are quite different. The TSP and DCP can be compared with the ERP using the windowed S-PSNR metric described above, with a window defined around the center of each front face. For example, for a default viewport with orientation pitch 90° and yaw 0°, a window with size 120° is defined by latitude interval [90°−60°, 90°+60°] and longitude interval [0°−60°, 0°+60°]. In general, for a viewport with orientation pitch $\Phi$ and yaw $\theta$ and window size 24, the window for computing the S-PSNR metric can be defined as described above. In one illustrative example, the window sizes in this comparison range from 90° to 180° in steps of 10°. In a real-world implementation, the actual window sizes observed by the viewer will depend on the viewer's head rotational speed and switching delays, as noted above. For the 30 viewport case, the 180° window size would correspond with a rotational speed of approx. 45°/sec, which is a speed at which motion blur effects will affect the experienced quality depending on display characteristics. This observation also applies to the viewing of ERP content and, therefore, a comparison with larger window sizes needs to consider these effects on quality.

The BD-rates are computed with ERP encodings as the anchor, and with TSP and DCP encodings as the test. For TSP and DCP, the encoding bit rates and windowed S-PSNR values are averaged across the 30 viewports.

Figure 11:
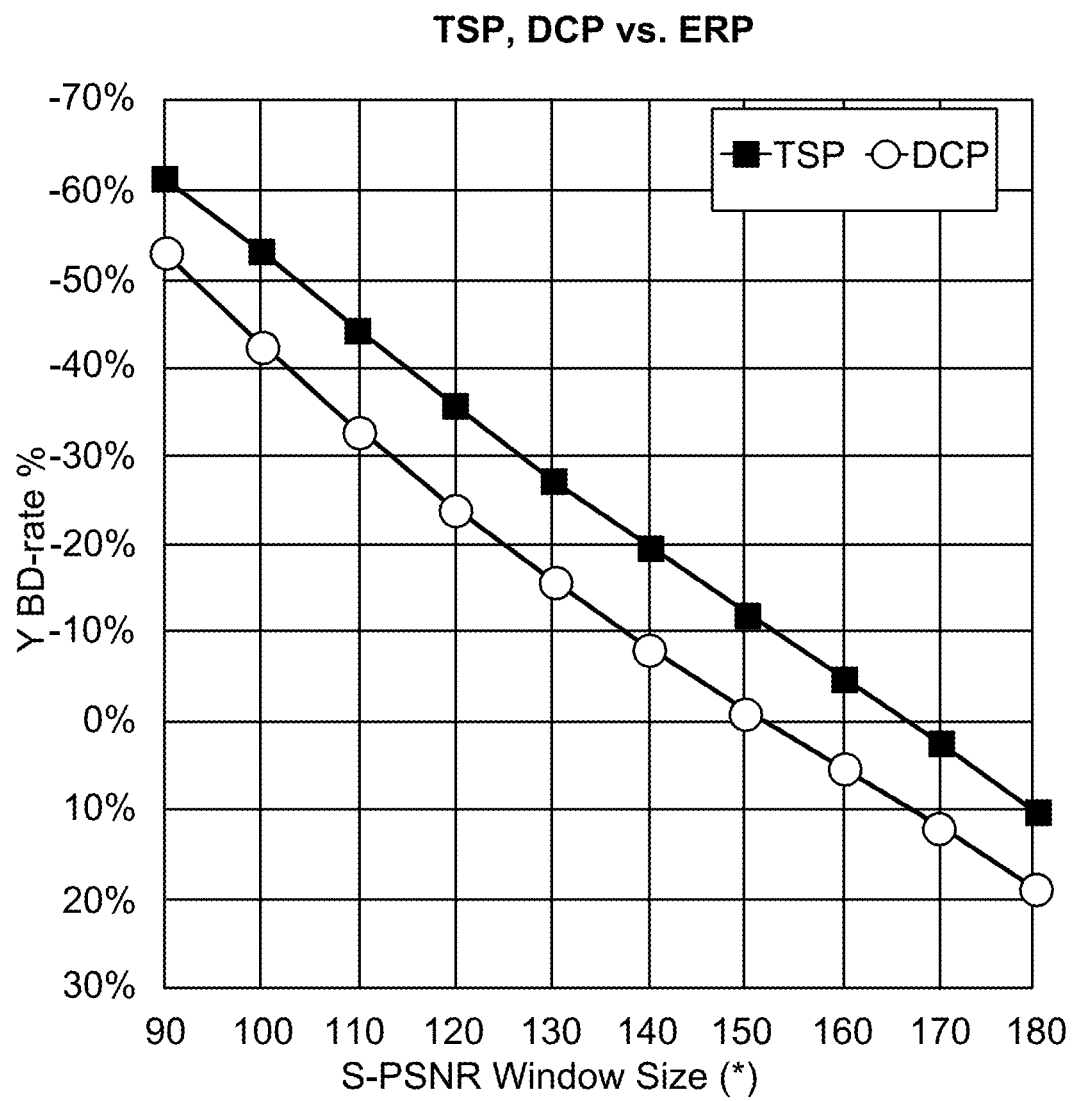
FIG. 11 is a chart illustrating a BD-rate comparison between ERP and TSP and DCP (DCP) projections, in accordance with some examples.

Table 4 below enumerates BD-rate results as a function of the S-PSNR window size for TSP and DCP. FIG. 11 is a plot of the Y component BD-rates. For TSP, there is a Y component BD-rate gain of 61.5% for S-PSNR window size 90°, and the gain decreases approximately linearly with the window size. TSP exhibits BD-rate gain up to approximately window size 170°. For DCP, the BD-rate gain is 8-12% lower than for TSP across all window sizes. DCP has BD-rate gain up to approximately window size 150°. The BD-rate gain of TSP over DCP can be expected, because the quality roll-off of TSP is smoother than DCP, and because DCP has 12.5% more pixels per frame than TSP, while the front faces are equal.

TABLE 4

| | ERP (Anchor) | | | | | |
| --- | --- | --- | --- | --- | --- | --- |
| | TSP BD-rate (Test) | | | DCP BD-rate (Test) | | |
| S-PSNR Win (°) | Y | U | V | Y | U | V |
| 90 | −61.54% | −64.67% | −65.40% | −53.47% | −58.63% | −60.19% |
| 100 | −53.25% | −58.73% | −59.68% | −42.88% | −50.30% | −52.12% |
| 110 | −44.45% | −52.88% | −54.10% | −33.22% | −42.76% | −44.91% |
| 120 | −35.89% | −46.95% | −48.45% | −24.25% | −35.52% | −38.21% |
| 130 | −27.59% | −40.81% | −42.94% | −16.14% | −28.40% | −31.82% |
| 140 | −19.89% | −34.70% | −37.16% | −8.53% | −21.60% | −25.48% |
| 150 | −12.44% | −28.73% | −31.17% | −1.57% | −15.23% | −19.15% |
| 160 | −5.30% | −22.78% | −24.81% | 5.11% | −8.97% | −12.47% |
| 170 | 2.14% | −16.18% | −17.89% | 11.61% | −2.35% | −5.69% |
| 180 | 9.89% | −9.40% | −10.93% | 18.47% | 4.61% | 1.27% |

Figure 12:
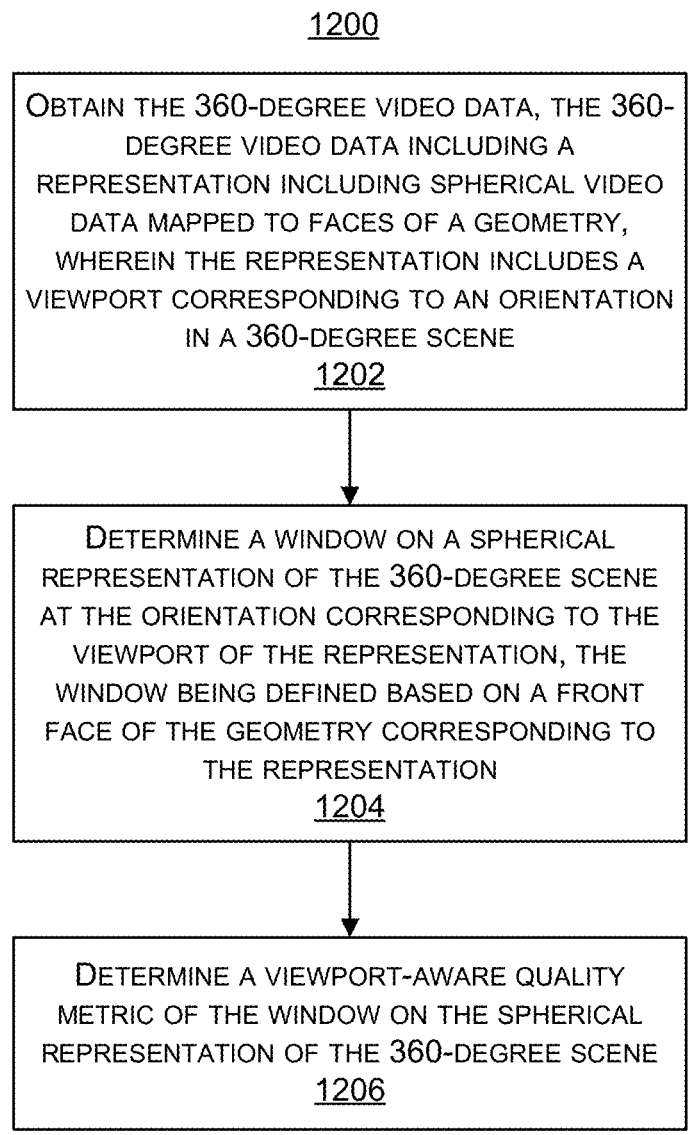
FIG. 12 is a flowchart illustrating an example of a process for processing 360-degree video data, in accordance with some examples.

FIG. 12 is a flowchart illustrating an example of a process 1200 for processing 360-degree video data using the techniques described herein. At block 1202, the process 1200 includes obtaining the 360-degree video data. The 360-degree video data includes a representation including spherical video data mapped to faces of a geometry. For example, the representation can include a viewport representation including a viewport corresponding to an orientation in a 360-degree scene. The viewport can correspond to a front face of the geometry. In some implementations, the geometry includes a truncated square pyramid (TSP), and the spherical video data of the representation is mapped to six faces of the TSP. In some aspects, the geometry includes a cube geometry. In some implementations, the geometry includes a geometry based on a downsampled cube map projection (DCP). Any other suitable geometry can be used.

At block 1204, the process 1200 includes determining a window on a spherical representation of the 360-degree scene at the orientation corresponding to the viewport of the representation. The window is determined based on a front face of the geometry corresponding to the representation. For example, the field of view of the front face can be used in determining the size of the window.

At block 1206, the process 1200 includes determining a viewport-aware quality metric of the window on the spherical representation of the 360-degree scene. In some implementations, determining the viewport-aware quality metric of the window on the spherical representation of the 360-degree scene includes computing a Spherical-Signal-to-Noise ratio (S-PSNR) of video data in the window. In such implementations, computation of the S-PSNR is restricted to the video data in the window to determine the viewport-aware quality metric of the window. For instance, the process 1200 can determine a set of uniformly sampled points on the sphere that are within the window. The process 1200 can map a point on the sphere to a corresponding point on a ground truth frame (e.g., the original video frame before being coded) and can also map the point on the sphere to a point on a coded picture (e.g., a frame packed using the geometry). The process 1200 can compute pixel values at the two locations (on the ground truth frame and on the coded picture) and can determine the error between these pixels. The process 1200 can perform similar steps for every sample point in the window on the sphere, and the resulting error for all of the points in the window indicates the S-PSNR for the window.

In some cases, the 360-degree video data includes a plurality of representations including spherical video data mapped to faces of the geometry. Each representation of the plurality of representations includes a different viewport corresponding to a different orientation in a 360-degree scene. An example of a plurality of viewport representations mapped to a geometry include the multiple TSP maps shown in FIG. 5D. In such cases, the process 1200 can determine a plurality of windows on the spherical representation of the 360-degree scene. Each of the plurality of windows can be determined based on each front face of the geometry corresponding to each representation (e.g., the FOVs of the front faces of the TSPs shown in FIG. 5D). In some examples, as shown in FIG. 7 and FIG. 8A-FIG. 8B, the plurality of windows include front face centers of the plurality of representations distributed on the spherical representation of the 360-degree scene. In some aspects, the plurality of windows defined on the spherical representation of the 360-degree scene are overlapping, as shown in FIG. 9.

The process 1200 can determine viewport-aware quality metrics for the plurality of windows on the spherical representation of the 360-degree scene, and can then determine a combined viewport-aware quality metric for the plurality of representations. In some cases, determining the combined viewport-aware quality metric for the plurality of representations can include averaging the determined viewport-aware quality metrics for the plurality of windows. In some cases, determining the combined viewport-aware quality metric for the plurality of representations can include determining a media value from among the viewport-aware quality metrics determined for the plurality of windows.

In some examples, the window is determined by computing a probability weighted observable window size for the window. The probability weighted observable window size of the window is based on the front face of the geometry corresponding to the representation and at least one or more of an amount of separation between the window and at least one other window of at least one other representation of the 360-degree video data, an estimated head rotational speed of a viewer of the 360-degree video data, a switching delay associated with switching between representations of the 360-degree video data, or any combination thereof. For instance, as noted above, the probability weighted observable window size can be determined based on the following equation:

$$window\_size = FOV + front\_viewport\_separation + rotational\_speed \times switching\_delay \times 2$$

In some examples, the process 1200 may be performed by a computing device or an apparatus, such as the server 602, the client device 604, the encoding device 104, the decoding device 112, or any other computing device. In some cases, the computing device or apparatus may include a processor, microprocessor, microcomputer, or other component of a device that is configured to carry out the steps of process 1200. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data or other network data.

Process 1200 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The viewport-aware techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 13:
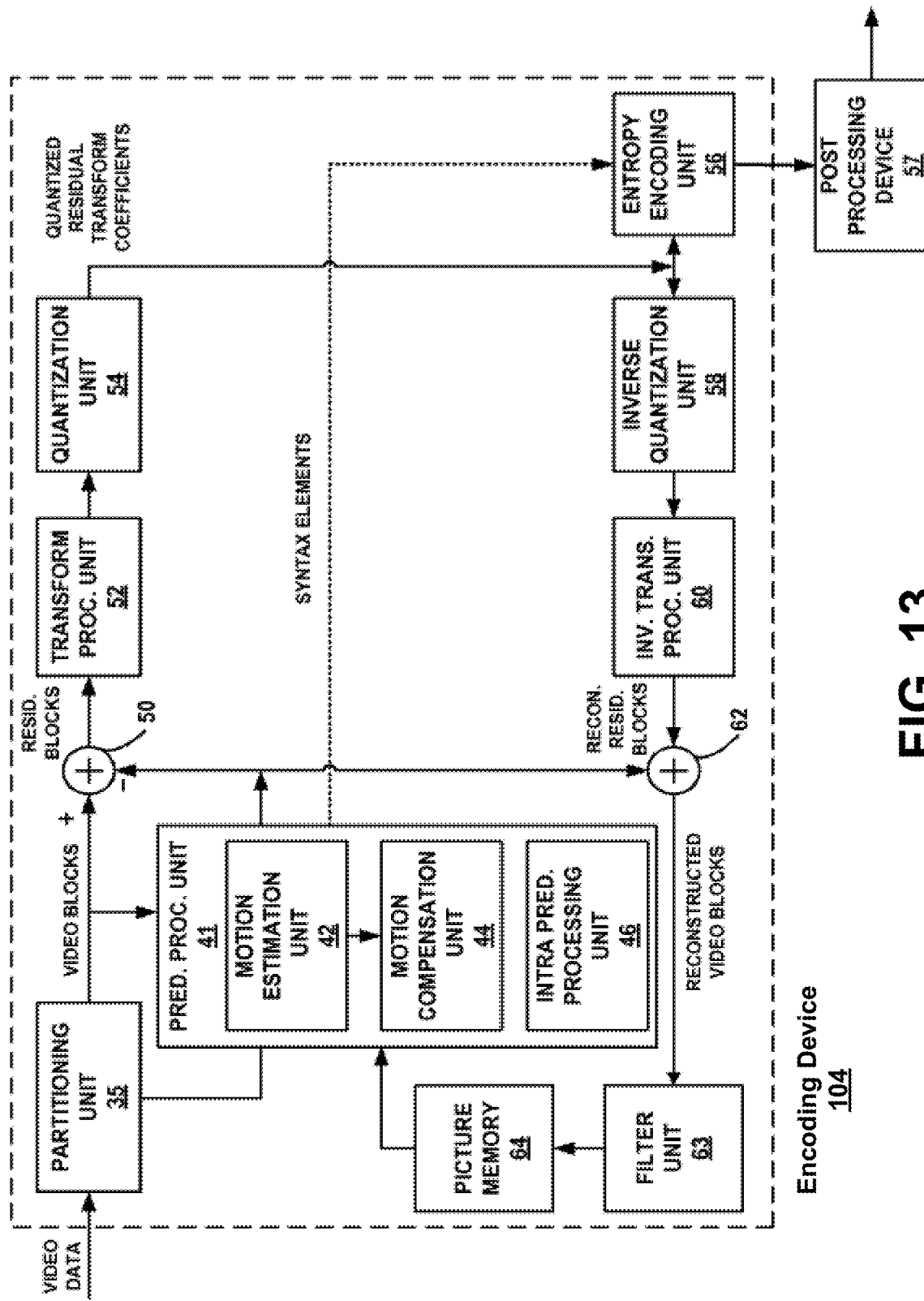
FIG. 13 is a block diagram illustrating an example video encoding device, in accordance with some examples.
Figure 14:
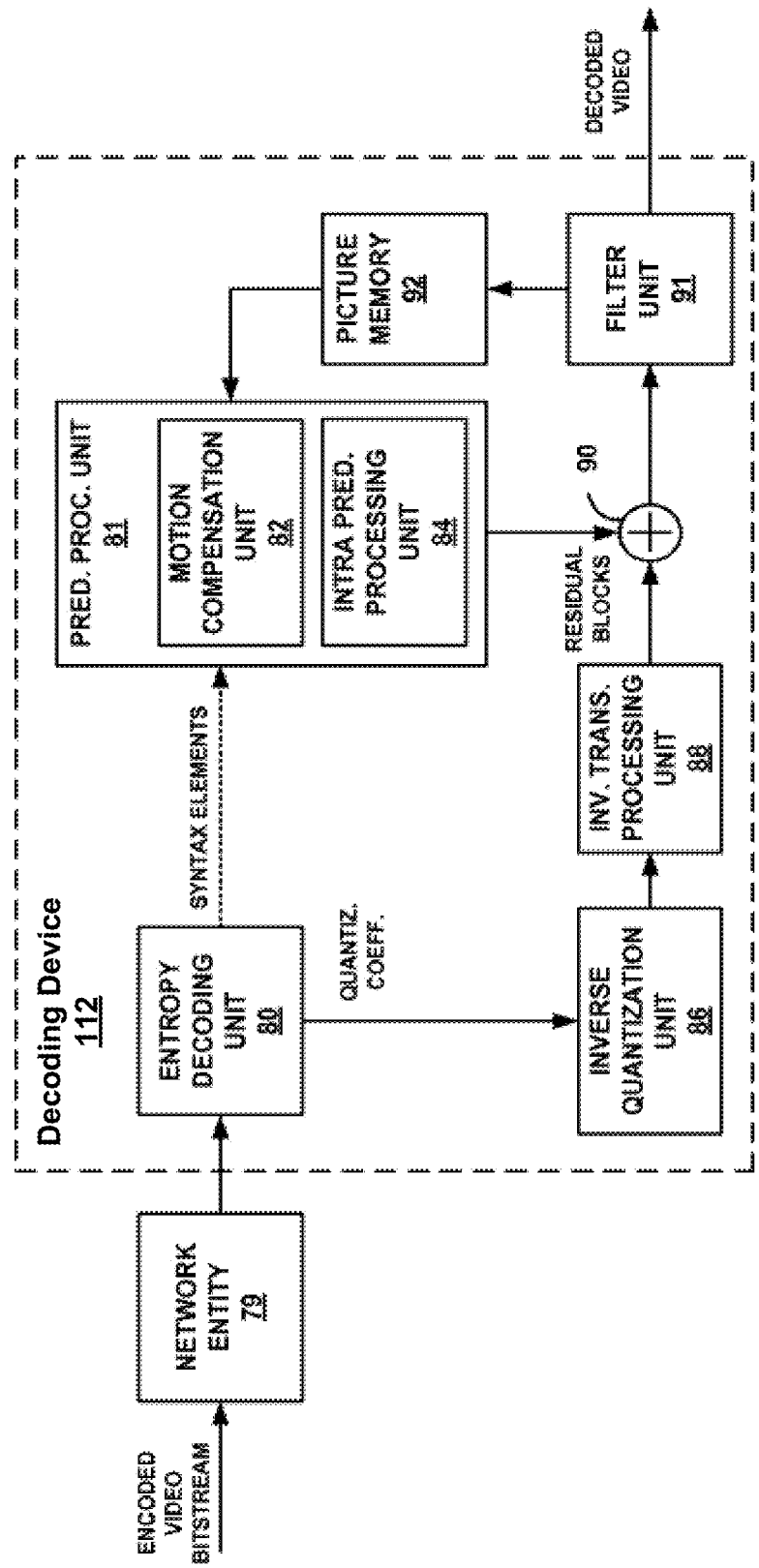
FIG. 14 is a block diagram illustrating an example video decoding device, in accordance with some examples.

Specific details of the encoding device 104 and the decoding device 112 are shown in FIG. 13 and FIG. 14, respectively. FIG. 13 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 13 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 13, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bitrate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 13 represents an example of a video encoder configured to derive LIC parameters, adaptively determine sizes of templates, and/or adaptively select weights. The encoding device 104 may, for example, derive LIC parameters, adaptively determine sizes of templates, and/or adaptively select weights sets as described above. For instance, the encoding device 104 may perform any of the techniques described herein, including the processes described above with respect to FIG. 12. In some cases, some of the techniques of this disclosure may also be implemented by post processing device 57.

FIG. 14 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 13.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 14 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 14 represents an example of a video decoder configured to derive LIC parameters, adaptively determine sizes of templates, and/or adaptively select weights. The decoding device 112 may, for example, derive LIC parameters, adaptively determine sizes of templates, and/or adaptively select weights sets as described above. For instance, the decoding device 112 may perform any of the techniques described herein, including the processes described above with respect to FIG. 12.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing 360-degree video data, the method comprising:
   obtaining the 360-degree video data, the 360-degree video data including a first representation including spherical video data mapped to faces of a first geometry and a second representation including spherical video data mapped to faces of a second geometry, wherein the first representation is associated with a first viewport corresponding to a first orientation in a 360-degree scene and the second representation is associated with a second viewport corresponding to a second orientation in the 360-degree scene;
   determining a first window on a spherical representation of the 360-degree scene at the first orientation corresponding to the first viewport of the first representation, the first window being determined based on a front face of the first geometry;
   determining a second window on the spherical representation of the 360-degree scene at the second orientation corresponding to the second viewport of the second representation, the second window being determined based on a front face of the second geometry;
   determining a first quality metric of the first window on the spherical representation of the 360-degree scene and a second quality metric of the second window on the spherical representation of the 360-degree scene; and
   determining, using at least the first quality metric and the second quality metric, a combined quality metric for the 360-degree video data.

2. The method of claim 1, wherein determining the combined quality metric includes averaging at least the first quality metric and the second quality metric.

3. The method of claim 1, wherein the first window and the second window on the spherical representation of the 360-degree scene include front face centers of the first representation and the second representation distributed on the spherical representation of the 360-degree scene.

4. The method of claim 1, wherein the first window and the second window on the spherical representation of the 360-degree scene are overlapping.

5. The method of claim 1, wherein determining the first quality metric includes computing a Spherical-Signal-to-Noise ratio (S-PSNR) of video data in the first window.

6. The method of claim 5, wherein computation of the S-PSNR is restricted to the video data in the first window to determine the first quality metric of the first window.

7. The method of claim 1, wherein the first geometry includes a first truncated square pyramid (TSP) and the second geometry includes a second TSP, wherein the spherical video data of the first representation is mapped to six faces of the first TSP, and wherein the spherical video data of the second representation is mapped to six faces of the second TSP.

8. The method of claim 1, wherein the first window is determined by computing a window size for the first window, the window size being computed based on the front face of the first geometry corresponding to the first representation and at least one or more of an amount of separation between the first window and at least one other window of at least one other representation of the 360-degree video data, an estimated head rotational speed of a viewer of the 360-degree video data, or a switching delay associated with switching between representations of the 360-degree video data.

9. The method of claim 1, wherein computation of the first quality metric is restricted to video data in the first window to determine the first quality metric of the first window.

10. An apparatus for processing 360-degree video data, comprising:
    a memory configured to store the 360-degree video data; and
    a processor configured to:
       obtain the 360-degree video data, the 360-degree video data including a first representation including spherical video data mapped to faces of a first geometry and a second representation including spherical video data mapped to faces of a second geometry, wherein the first representation is associated with a first viewport corresponding to a first orientation in a 360-degree scene and the second representation is associated with a second viewport corresponding to a second orientation in the 360-degree scene;
       determine a first window on a spherical representation of the 360-degree scene at the first orientation corresponding to the first viewport of the first representation, the first window being determined based on a front face of the first geometry;
       determine a second window on the spherical representation of the 360-degree scene at the second orientation corresponding to the second viewport of the second representation, the second window being determined based on a front face of the second geometry;
       determine a first quality metric of the first window on the spherical representation of the 360-degree scene and a second quality metric of the second window on the spherical representation of the 360-degree scene; and
       determine, using at least the first quality metric and the second quality metric, a combined quality metric for the 360-degree video data.

11. The apparatus of claim 10, wherein determining the combined quality metric includes averaging at least the first quality metric and the second quality metric.

12. The apparatus of claim 10, wherein the first window and the second window on the spherical representation of the 360-degree scene include front face centers of the first representation and the second representation distributed on the spherical representation of the 360-degree scene.

13. The apparatus of claim 10, wherein the first window and the second window on the spherical representation of the 360-degree scene are overlapping.

14. The apparatus of claim 10, wherein determining the first quality metric includes computing a Spherical-Signal-to-Noise ratio (S-PSNR) of video data in the first window.

15. The apparatus of claim 14, wherein computation of the S-PSNR is restricted to the video data in the first window to determine the quality metric of the first window.

16. The apparatus of claim 10, wherein the first geometry includes a first truncated square pyramid (TSP) and the second geometry includes a second TSP, wherein the spherical video data of the first representation is mapped to six faces of the first TSP, and wherein the spherical video data of the second representation is mapped to six faces of the second TSP.

17. The apparatus of claim 10, wherein the first window is determined by computing a window size for the first window, the window size being computed based on the front face of the first geometry corresponding to the first representation and at least one or more of an amount of separation between the first window and at least one other window of at least one other representation of the 360-degree video data, an estimated head rotational speed of a viewer of the 360-degree video data, or a switching delay associated with switching between representations of the 360-degree video data.

18. The apparatus of claim 10, further comprising:
a display for displaying the video data.

19. The apparatus of claim 10, wherein the apparatus comprises a mobile device with a camera for capturing pictures.

20. The apparatus of claim 10, wherein computation of the first quality metric is restricted to video data in the first window to determine the first quality metric of the first window.

21. A non-transitory computer-readable medium having stored thereon instructions that, when executed by one or more processors, cause the one or more processors to:
obtain 360-degree video data, the 360-degree video data including a first representation including spherical video data mapped to faces of a first geometry and a second representation including spherical video data mapped to faces of a second geometry, wherein the first representation is associated with a first viewport corresponding to a first orientation in a 360-degree scene and the second representation is associated with a second viewport corresponding to a second orientation in the 360-degree scene;
determine a first window on a spherical representation of the 360-degree scene at the first orientation corresponding to the first viewport of the first representation, the first window being determined based on a front face of the first geometry;
determine a second window on the spherical representation of the 360-degree scene at the second orientation corresponding to the second viewport of the second representation, the second window being determined based on a front face of the second geometry;
determine a first quality metric of the first window on the spherical representation of the 360-degree scene and a second quality metric of the second window on the spherical representation of the 360-degree scene; and
determine, using at least the first quality metric and the second quality metric, a combined quality metric for the 360-degree video data.

22. The non-transitory computer-readable medium of claim 21, wherein the first window and the second window on the spherical representation of the 360-degree scene include front face centers of the first representation and the second representation distributed on the spherical representation of the 360-degree scene.

23. The non-transitory computer-readable medium of claim 21, wherein determining the first quality metric includes computing a Spherical-Signal-to-Noise ratio (S-PSNR) of video data in the first window.

24. The non-transitory computer-readable medium of claim 23, wherein computation of the S-PSNR is restricted to the video data in the first window to determine the quality metric of the first window.

25. The non-transitory computer-readable medium of claim 21, wherein the first geometry includes a first truncated square pyramid (TSP) and the second geometry includes a second TSP, wherein the spherical video data of the first representation is mapped to six faces of the first TSP, and wherein the spherical video data of the second representation is mapped to six faces of the second TSP.

26. The non-transitory computer-readable medium of claim 21, wherein the first window is determined by computing a window size for the first window, the window size being computed based on the front face of the first geometry corresponding to the first representation and at least one or more of an amount of separation between the first window and at least one other window of at least one other representation of the 360-degree video data, an estimated head rotational speed of a viewer of the 360-degree video data, or a switching delay associated with switching between representations of the 360-degree video data.

27. An apparatus for processing 360-degree video data, comprising:
means for obtaining the 360-degree video data, the 360-degree video data including a first representation including spherical video data mapped to faces of a first geometry and a second representation including spherical video data mapped to faces of a second geometry, wherein the first representation is associated with a first viewport corresponding to a first orientation in a 360-degree scene and the second representation is associated with a second viewport corresponding to a second orientation in the 360-degree scene;
means for determining a first window on a spherical representation of the 360-degree scene at the first orientation corresponding to the first viewport of the first representation, the first window being determined based on a front face of the first geometry;
means for determining a second window on the spherical representation of the 360-degree scene at the second orientation corresponding to the second viewport of the second representation, the second window being determined based on a front face of the second geometry;
means for determining a first quality metric of the first window on the spherical representation of the 360-degree scene and a second quality metric of the second window on the spherical representation of the 360-degree scene; and
means for determining, using at least the first quality metric and the second quality metric, a combined quality metric for the 360-degree video data.

* * * * *